United States Patent
Gao et al.

(10) Patent No.: US 12,200,520 B2
(45) Date of Patent: Jan. 14, 2025

(54) COMMUNICATION METHOD AND COMMUNICATIONS APPARATUS

(71) Applicant: Huawei Technologies Co., Ltd., Shenzhen (CN)

(72) Inventors: Fei Gao, Shanghai (CN); Shurong Jiao, Shanghai (CN); Ruixiang Ma, Shenzhen (CN); Meng Hua, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 291 days.

(21) Appl. No.: 17/669,825

(22) Filed: Feb. 11, 2022

(65) Prior Publication Data

US 2022/0167194 A1 May 26, 2022

Related U.S. Application Data

(63) Continuation of application No. PCT/CN2020/109367, filed on Aug. 14, 2020.

(30) Foreign Application Priority Data

Aug. 14, 2019 (CN) .......................... 201910749410.9

(51) Int. Cl.
*H04W 24/08* (2009.01)
*H04W 72/04* (2023.01)
(Continued)

(52) U.S. Cl.
CPC ....... *H04W 24/08* (2013.01); *H04W 72/0446* (2013.01); *H04W 72/23* (2023.01); *H04W 72/51* (2023.01)

(58) Field of Classification Search
CPC ............. H04W 24/08; H04W 72/0446; H04W 72/042; H04W 72/048; H04W 72/51;
(Continued)

(56) References Cited

U.S. PATENT DOCUMENTS 10,939,427 B2 * 3/2021 Yang ..................... H04W 72/23
11,051,200 B2 * 6/2021 Lee ......................... H04L 25/02
(Continued)

FOREIGN PATENT DOCUMENTS

| CN | 102640556 A | 8/2012 |
| CN | 103906244 A | 7/2014 |

(Continued)

OTHER PUBLICATIONS

Huawei, "Summary of Thursday offline discussion on PDCCH enhancements", 3GPP TSG RAN WG1 Meeting #97, R1-1907835, May 13-17, 2019 , 65 pages, Reno, USA.

(Continued)

*Primary Examiner* — Rasheed Gidado
(74) *Attorney, Agent, or Firm* — Slater Matsil, LLP

(57) ABSTRACT

This application discloses a communication method, which includes: A terminal side device determines, based on configuration information sent by a network side device, positions of a first time subunit and a second time subunit for monitoring a downlink control channel; and determines, based on a parameter corresponding to the first time subunit, a monitoring capability corresponding to the first time subunit, where the parameter corresponding to the first time subunit includes at least one of the following: a first time domain interval between a start position of the first time subunit and a start position of the second time subunit; a time domain length of the first time subunit; and a second time domain interval between the first time subunit and the second time subunit.

18 Claims, 10 Drawing Sheets

(51) Int. Cl.
  *H04W 72/0446* (2023.01)
  *H04W 72/23* (2023.01)
  *H04W 72/51* (2023.01)
(58) Field of Classification Search
  CPC .... H04W 72/23; H04L 1/0038; H04L 1/0072; H04L 1/0046; H04L 5/0053; H04L 5/0094
  See application file for complete search history.

(56) References Cited

U.S. PATENT DOCUMENTS

| | | | |
|---|---|---|---|
| 11,337,198 B2* | 5/2022 | Tang | H04L 5/0053 |
| 2018/0270143 A1 | 9/2018 | Currivan et al. | |
| 2020/0145984 A1* | 5/2020 | Hosseini | H04W 48/16 |
| 2020/0169991 A1 | 5/2020 | Lin et al. | |
| 2020/0221379 A1* | 7/2020 | Choi | H04W 52/0216 |
| 2020/0221462 A1* | 7/2020 | Tang | H04W 72/53 |
| 2021/0227514 A1* | 7/2021 | Takeda | H04L 5/001 |
| 2022/0132478 A1* | 4/2022 | Wu | H04W 16/14 |
| 2022/0279490 A1* | 9/2022 | Wang | H04L 1/0046 |

FOREIGN PATENT DOCUMENTS

| | | |
|---|---|---|
| CN | 108023714 A | 5/2018 |
| CN | 109690988 A | 4/2019 |
| CN | 110062397 A | 7/2019 |

OTHER PUBLICATIONS

Samsung et al., "Introduction of Ultra Reliable Low Latency Communications Enhancements", 3GPP TSG-RAN WG1 Meeting #99, R1-1913649, Nov. 18-22, 2019, 3 pages, Reno, USA.
Huawei et al., "Summary of email discussion [100e-NR-L1enh_URLLC_PDCCH-02] on remaining issues on PDCCH candidate overbooking and dropping", 3GPP TSG RAN WG1 Meeting #100-e, R1-2001408, Feb. 24-Mar. 6, 2020, 31 pages.
Samsung et al., "Corrections on Ultra Reliable Low Latency Communications Enhancements", 3GPP TSG-RAN WG1 Meeting #100-e, R1-2001460, e-Meeting, Feb. 24-Mar. 6, 2020, 6 pages.
Nokia et al., "On PDCCH Enhancements for NR URLLC", 3GPP TSG RAN WG1#98, R1-1908436, Aug. 26-30, 2019, 17 pages, Prague, Czech.
Nokia et al., "On PDCCH Enhancements for NR URLLC", 3GPP TSG RAN WG1#97 R1-1906751, May 13-17, 2019, 17 pages, Reno, Nevada, US.
Nokia et al., "On PDCCH Enhancements for NR URLLC", 3GPP TSG RAN WG1 Meeting #96bis, R1-1904827, Apr. 8-12, 2019,10 pages, Xi'an, China.
Huawei, HiSilicon et al., "New WID: Physical Layer Enhancements for NR Ultra-Reliable and Low Latency Communication (URLLC)", 3GPP TSG RAN Meeting #83, RP-190726, Mar. 18-21, 2019, 5 pages, Shenzhen, China.
NTT DoComo, Inc. et al., "UCI enhancements for URLLC", 3GPP TSG RAN WG1 Ad-Hoc Meeting 1901, R1-1900970, Jan. 21-25, 2019, 8 pages, Taipei.
3GPP TS 38.213 V15.7.0 (Sep. 2019), 3rd Generation Partnership Project; Technical Specification Group Radio Access Network; NR; Physical layer procedures for control (Release 15), 108 pages.
3GPP TS 38.331 V15.7.0 (Sep. 2019), 3rd Generation Partnership Project; Technical Specification Group Radio Access Network; NR; Radio Resource Control (RRC) protocol specification (Release 15), 301pages.
3GPP TS 38.213 V16.0.0 (Sep. 2019), 3rd Generation Partnership Project; Technical Specification Group Radio Access Network; NR; Physical layer procedures for control (Release 16), 146 pages.
"Discussion on PDCCH Enhancements for URLLC," Agenda Item: 7.2.6.1, Source: Spreadtrum Communications, Document for: Discussion and Decision, 3GPP TSG RAN WG1 #97, R1-1906357, Reno, USA, May 13-17, 2019, 15 pages.
"DL Control for URLLC," Agenda Item: 7.2.6.1, Source: Samsung, Document for: Discussion and Decision, 3GPP TSG RAN WG1 #97, R1-1906955, Reno, USA, May 13-17, 2019, 4 pages.
Qualcomm Incorporated, 3GPP TSG RAN WG1 Meeting #94, R1-1809426, "Maintenance for physical downlink control channel", Gothenburg, Sweden, Aug. 20-Aug. 24, 2018, total 15 pages.

* cited by examiner

| Symbol | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| (7, 3) | Span-1a | | | | | | | Span-1b | | | | | | |
| (4, 3) | Span-2a | | | | Span-2b | | | | Span-2c | | | | | |
| (2, 2) | Span-3a | | Span-3b | | Span-3c | | Span-3d | | Span-3e | | Span-3f | | Span-3g | |

FIG. 3c

COMMUNICATION METHOD AND COMMUNICATIONS APPARATUS

CROSS-REFERENCE TO RELATED APPLICATIONS

This application is a continuation of International Application No. PCT/CN2020/109367, filed on Aug. 14, 2020, which claims priority to Chinese Patent Application No. 201910749410.9, filed on Aug. 14, 2019. The aforementioned applications are hereby incorporated by reference in their entities.

TECHNICAL FIELD

This application relates to the field of communications technologies, and in particular, to a communication method and a communications apparatus.

BACKGROUND

In a communications system, a network side device may send downlink control information (CI) to a terminal side device through a physical downlink control channel (PDCCH). For example, the network side device may configure a search space set corresponding to each piece of DCI for the terminal side device by using higher layer signaling, but does not notify the terminal side device of a candidate PDCCH or candidate PDCCHs on which the DCI is to be sent in the search space set. The terminal side device may determine, based on configuration information sent by the network side device, DCI currently expected to be received, and therefore the terminal side device may perform, based on the configuration information, channel estimation on a PDCCH candidate in a search space set corresponding to the to-be-received DCI, and monitor whether the candidate PDCCH carries the DCI. Considering that the terminal side device may consume a large amount of power due to relatively high detection complexity, in a new radio (NR) system, a monitoring capability of the terminal side device in one slot may be set, and then the terminal side device may monitor a PDCCH in the slot based on the monitoring capability.

Main application scenarios of an ultra-reliable and low-latency communications (URLLC) service in the NR system include unmanned driving, telemedicine, remote automation control, and the like, and these application scenarios have a relatively high requirement for a data transmission latency. Therefore, to meet a latency requirement of the URLLC service, a time subunit, for example, a span, smaller than the slot is introduced in the NR system.

However, in the case of introducing the time subunit (for example, the span), how the terminal side device monitors a PDCCH needs further study.

SUMMARY

In view of this, this application provides a communication method and a communications apparatus, to determine a monitoring capability corresponding to a time subunit, so that a terminal side device can monitor a PDCCH in the time subunit.

According to a first aspect, an embodiment of this application provides a communication method. The method includes: A terminal side device receives configuration information sent by a network side device, where the configuration information is used to indicate a position for monitoring a downlink control channel; determines, based on the configuration information, positions of a first time subunit and a second time subunit for monitoring the downlink control channel; and determines, based on a parameter corresponding to the first time subunit, a monitoring capability corresponding to the first time subunit, where the parameter corresponding to the first time subunit includes at least one of the following: a first time domain interval between a start position of the first time subunit and a start position of the second time subunit; a time domain length of the first time subunit; and a second time domain interval between the first time subunit and the second time subunit.

According to the method, the terminal side device can determine the monitoring capability corresponding to the first time subunit, so that the terminal side device can monitor a PDCCH in the first time subunit based on the monitoring capability corresponding to the first time subunit.

In this embodiment of this application, the monitoring capability corresponding to the first time subunit may include a maximum quantity of PDCCH monitoring times of the terminal side device in the first time subunit, and/or a maximum value of a quantity of CCEs used by the terminal side device for channel estimation in the first time subunit.

In a possible design, the second time subunit is located behind the first time subunit, or the second time subunit is located in front of the first time subunit.

In a possible design, the second time subunit is a non-empty time subunit that is located behind the first time subunit and closest to the first time subunit; or the second time subunit is a non-empty time subunit that is located in front of the first time subunit and closest to the first time subunit, where a search space set exists in the non-empty time subunit.

In this embodiment of this application, because PDCCH monitoring is unneeded in an empty time subunit, the second time subunit may be the non-empty time subunit, so that the monitoring capability determined based on the parameter corresponding to the first time subunit is more reasonable.

In a possible design, that the terminal side device determines, based on a parameter corresponding to the first time subunit, a monitoring capability corresponding to the first time subunit includes: The terminal side device obtains at least one monitoring parameter supported by the terminal side device and a monitoring capability corresponding to the at least one monitoring parameter; the terminal side device determines a target monitoring parameter that matches the parameter corresponding to the first time subunit from the at least one monitoring parameter; and the terminal side device determines, based on a monitoring capability corresponding to the target monitoring parameter, the monitoring capability corresponding to the first time subunit.

In a possible design, each of the at least one monitoring parameter includes a minimum time domain interval between start positions of two adjacent time subunits located in a same time unit; and a minimum time domain interval, between start positions of two adjacent time subunits located in a same time unit, included in the target monitoring parameter is less than or equal to the first time domain interval.

According to the method, the target monitoring parameter can be determined based on the first time domain interval. This manner is relatively simple and convenient.

In a possible design, each of the at least one monitoring parameter includes a minimum time domain interval between start positions of two adjacent time subunits located in a same time unit and a maximum time domain length of each time subunit in the time unit; and a minimum time domain interval, between start positions of two adjacent time subunits located in a same time unit, included in the target monitoring parameter is less than or equal to the first time domain interval, and a maximum time domain length, of each time subunit in the time unit, included in the target monitoring parameter is less than or equal to the time domain length of the first time subunit.

In a possible design, each of the at least one monitoring parameter includes a minimum time domain interval between start positions of two adjacent time subunits located in a same time unit and a maximum time domain length of each time subunit in the time unit; and a minimum time domain interval, between two adjacent time subunits in a same time unit, obtained based on the target monitoring parameter is less than or equal to the second time interval.

According to the method, the target monitoring parameter can be determined based on the first time domain interval and the time domain length of the first time subunit; in other words, both the first time domain interval and the time domain length of the first time subunit are considered when the target monitoring parameter is determined, so that the determined target monitoring parameter is more reasonable and accurate.

In a possible design, each of the at least one monitoring parameter includes a minimum time domain interval between start positions of two adjacent time subunits located in a same time unit; and an absolute value of a difference between a minimum time domain interval included in the target monitoring parameter and the first time domain interval is less than or equal to an absolute value of a difference between a minimum time domain interval included in a monitoring parameter other than the target monitoring parameter in the at least one monitoring parameter and the first time domain interval.

In a possible design, that the terminal side device determines, based on a monitoring capability corresponding to the target monitoring parameter, the monitoring capability corresponding to the first time subunit includes: If the target monitoring parameter corresponds to a plurality of monitoring capabilities, the terminal side device determines that a minimum monitoring capability in the plurality of monitoring capabilities is the monitoring capability corresponding to the first time subunit.

According to the method, the minimum monitoring capability in the plurality of monitoring capabilities is selected as the monitoring capability corresponding to the first time subunit, so that it can be effectively ensured that the monitoring capability corresponding to the first time subunit falls within a capability range supported by the terminal side device.

In a possible design, that the terminal side device determines, based on a monitoring capability corresponding to the target monitoring parameter, the monitoring capability corresponding to the first time subunit includes: If the target monitoring parameter corresponds to a plurality of monitoring capabilities, when the first time subunit meets a first condition, the terminal side device determines that a maximum monitoring capability in the plurality of monitoring capabilities is the monitoring capability corresponding to the first time subunit, where the first condition includes: a common search space set and/or a search space set scheduled based on a time unit granularity exist/exists in the first time subunit; and/or the first time domain interval is greater than a first threshold.

In a possible design, the method further includes: The terminal side device receives indication information sent by the network side device, where the indication information is used to indicate a monitoring capability corresponding to the second time subunit; and the terminal side device obtains, based on the indication information, the monitoring capability corresponding to the second time subunit.

In a possible design, the monitoring capability corresponding to the second time subunit is one of at least one monitoring capability supported by the terminal side device.

In a possible design, the method further includes: The terminal side device determines a monitoring capability corresponding to another time subunit in a first time unit in which the first time subunit is located; the terminal side device determines a minimum monitoring capability based on the monitoring capability corresponding to the first time subunit and the monitoring capability corresponding to the another time subunit in the first time unit; and the terminal side device monitors the downlink control channel at least in each time subunit in the first time unit based on the minimum monitoring capability.

According to the method, the downlink control channel is monitored at least in time subunits in the first time unit based on a same monitoring capability, so that processing convenience of the terminal side device can be improved; and the monitoring capability is the minimum monitoring capability, so that it can be effectively ensured that monitoring is performed in each time subunit within the capability range of the terminal side device.

According to a second aspect, this application provides an apparatus. The apparatus has a function of implementing the terminal side device in the first aspect. For example, the apparatus includes modules, units, or means corresponding to the steps performed by the terminal side device in the first aspect. The function or the units or means may be implemented by using software, or may be implemented by using hardware, or may be implemented by using hardware by executing corresponding software.

In a possible design, the apparatus includes a processing unit and a transceiver unit, and functions performed by the processing unit and the transceiver unit may correspond to the steps performed by the terminal side device in the first aspect.

In a possible design, the apparatus includes a processor, and may further include a transceiver. The transceiver is configured to send and receive a signal. The processor executes a program instruction, to implement the method performed by the terminal side device in any one of the first aspect or the possible designs or implementations of the first aspect.

The apparatus may further include one or more memories. The memory is configured to couple to the processor. The one or more memories may be integrated with the processor, or may be disposed independent of the processor. This is not limited in this application.

In a possible design, the memory stores a computer program instruction and/or data necessary for implementing a function of the terminal side device in the first aspect. The processor may execute the computer program instruction stored in the memory, to implement the method performed by the terminal side device in any one of the first aspect or the possible designs or implementations of the first aspect.

According to a third aspect, an embodiment of this application provides a computer-readable storage medium. The computer storage medium stores a computer-readable instruction, and when a computer reads and executes the computer-readable instruction, the computer is enabled to perform the method in any one the possible designs.

According to a fourth aspect, an embodiment of this application provides a computer program product. When a computer reads and executes the computer program product, the computer is enabled to perform the method in any one of the possible designs.

According to a fifth aspect, an embodiment of this application provides a chip. The chip is connected to a memory, and is configured to read and execute a software program stored in the memory, to implement the method in any one of the possible designs.

According to a sixth aspect, an embodiment of this application provides a communications system, including the terminal side device in any one of the first aspect or the possible designs of the first aspect, and further including a network side device.

BRIEF DESCRIPTION OF THE DRAWINGS

FIG. 3c is a schematic diagram of a span pattern corresponding to monitoring parameters according to an embodiment of this application;

DETAILED DESCRIPTION OF ILLUSTRATIVE EMBODIMENTS

Figure 1A:
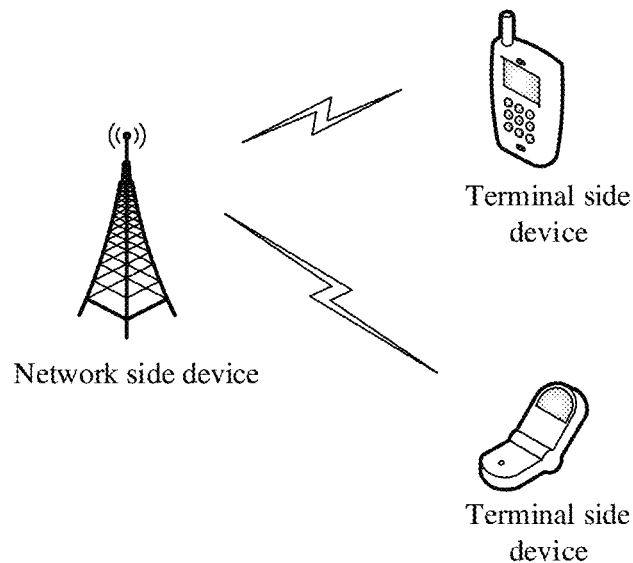
FIG. 1a is a schematic diagram of a possible system architecture to which the embodiments of this application are applicable.

To make objectives, technical solutions, and advantages of embodiments of this application clearer, the following further describes the embodiments of this application in detail with reference to the accompanying drawings.

In the following, some terms in the embodiments of this application are described, to facilitate understanding of a person skilled in the art.

(1) A terminal side device includes a device that provides a user with voice and/or data connectivity, for example, may include a handheld device with a wireless connection function, or a processing device connected to a wireless modem. The terminal side device may communicate with a core network via a radio access network (RAN), to exchange a voice and/or data with the RAN. The terminal side device may include user equipment (UE), a wireless terminal device, a mobile terminal device, a device-to-device (D2D) communication terminal device, a V2X terminal device, a machine-to-machine/machine type communication (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal side device may include a mobile phone (or referred to as a "cellular" phone), a computer with a mobile terminal device, or a portable, pocket-sized, handheld, or computer built-in mobile apparatus. For example, the terminal side device may include a device such as a personal communications service (PCS) phone, a cordless telephone set, a session initiation protocol (SIP) phone, a wireless local loop (WLL) station, or a personal digital assistant (PDA). Alternatively, the terminal side device includes a limited device such as a device with relatively low power consumption, a device with a limited storage capability, or a device with a limited computing capability. For example, the terminal side device includes an information sensing device such as a bar code, radio frequency identification (RFID), a sensor, a global positioning system (GPS), or a laser scanner. Alternatively, the terminal side device may be a chip used in the devices listed above.

(2) A network side device includes, for example, an access network (AN) device such as a base station (for example, an access point), and may be a device that communicates with a wireless terminal device by using one or more cells over an air interface in an access network. The base station may be configured to mutually convert a received over-the-air frame and an internet protocol (IP) packet and serve as a router between the terminal side device and a rest portion of the access network, where the rest portion of the access network may include an IP network. An RSU may be a fixed infrastructure entity that supports a V2X application, and may exchange a message with another entity that supports the V2X application. The network side device may further coordinate attribute management of the air interface. For example, the network side device may include an evolved NodeB (eNB, or e-NodeB,) in an LTE system or long term evolution-advanced (LTE-A) system, or may include a next generation NodeB (gNB) in an NR system, or may include a centralized unit (CU) and a distributed unit (DU) in a cloud access network (Cloud RAN) system. This is not limited in the embodiments of this application. Alternatively, the network side device may be a chip used in the devices listed above.

(3) A downlink control channel is, for example, a PDCCH, an enhanced physical downlink control channel (ePDCCH), or another downlink control channel, and is not specifically limited. In the embodiments of this application, an example in which the downlink control channel is a PDCCH is mainly used for description.

(4) A symbol includes but is not limited to an orthogonal frequency division multiplexing (OFDM) symbol, a single carrier frequency division multiple access (SC-FDMA) symbol, a sparse code multiple access (SCMA) symbol, a filtered orthogonal frequency division multiplexing (F-OFDM) symbol, or a non-orthogonal multiple access (NOMA) symbol. The symbol may be specifically determined based on an actual case, and details are not described herein.

(5) A slot is a basic time unit and occupies a plurality of consecutive OFDM or SC-FDMA symbols in time domain. For example, in a downlink direction of LTE, one slot occupies six or seven consecutive OFDM symbols in time domain; or in a downlink direction of NR, one slot occupies 14 consecutive OFDM symbols (normal cyclic prefix) or 12 consecutive OFDM symbols (extended cyclic prefix) in time domain. (6) The terms "system" and "network" may be used interchangeably in the embodiments of this application. The term "at least one" means one or more, and "plurality of" means two or more. The term "and/or" describes an association relationship between associated objects, and indicates that three relationships may exist. For example, A and/or B may indicate the following cases: Only A exists, both A and B exist, and only B exists, where A and B may be singular or plural. The character "/" usually indicates an "or" relationship between associated objects. The term "at least one of the following" or a similar expression indicates any combination of these terms, including a single term or any combination of plural terms. For example, at least one of a, b, or c may indicate a, b, c, a-b, a-c, b-c, or a-b-c, where a, b, and c each may be singular or plural.

In addition, unless otherwise stated, ordinal numbers such as "first" and "second" in the embodiments of this application are used to distinguish between a plurality of objects, and not used to limit an order, a time sequence, priorities, or importance of the plurality of objects. For example, a first time subunit and a second time subunit are merely used to distinguish between different time subunits, and do not indicate a difference in priorities, importance, or the like of the two time subunits.

FIG. 1a is a schematic diagram of a possible system architecture to which the embodiments of this application are applicable. The system architecture shown in FIG. is includes a network side device and a terminal side device. It should be understood that, a quantity of network side devices and a quantity of terminal side devices in the system architecture are not limited in the embodiments of this application. Moreover, in addition to the network side device and the terminal side device, the system architecture to which the embodiments of this application are applicable may further include other devices such as a core network device and a wireless relay device (also referred to as a wireless backhaul device). This is not limited in the embodiments of this application, either. In addition, all functions of the network side device in the embodiments of this application may be integrated into one independent physical device, or may be distributed on a plurality of independent physical devices. This is not limited in the embodiments of this application, either. Furthermore, the terminal side device in the embodiments of this application may be connected to the network side device in a wireless manner.

The illustrated system architecture is applicable to communications systems of various radio access technologies (RAT), such as an NR system and a communications system that may emerge in the future.

The system architecture and a service scenario described in the embodiments of this application are intended to describe the technical solutions in the embodiments of this application more clearly, and do not constitute a limitation on the technical solutions provided in the embodiments of this application. A person of ordinary skill in the art may know that, with evolution of a communications system architecture and emergence of a new service scenario, the technical solutions provided in the embodiments of this application are also applicable to similar technical problems.

In the system architecture illustrated in FIG. 1a, the network side device may transmit a PDSCH to the terminal side device. The PDSCH is usually scheduled by using control information carried in a PDCCH, and the control information is, for example, DCI. Therefore, to correctly receive the PDSCH, the terminal side device needs to first monitor the PDCCH, and obtain, based on the DCI carried in the PDCCH, related information needed for receiving the PDSCH, such as a time-frequency resource position and size of the PDSCH.

The following describes related technical features of monitoring the PDCCH by the terminal side device.

Figure 1B:
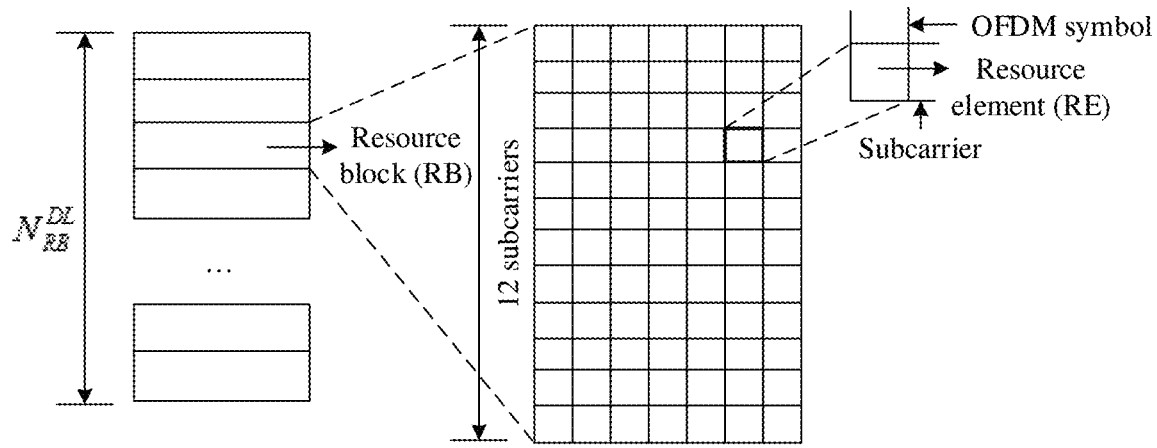
FIG. 1b is a schematic diagram of a downlink time-frequency resource grid.

For example, in an NR system, the PDCCH is divided into independent subcarriers in frequency domain, and a subcarrier spacing (SCS) may be determined based on a subcarrier spacing parameter u. For example, a common subcarrier spacing is 15 KHz or 30 KHz. A unit of an uplink/a downlink frequency domain resource is a resource block (RB), and each RB includes 12 consecutive subcarriers in frequency domain. FIG. 1b shows a downlink time-frequency resource grid. In FIG. 1b, $N_{RB}^{DL}$ indicates a quantity of resource blocks (RBs) scheduled in downlink at one time. One RB includes 12 consecutive subcarriers in frequency domain. Each element in the resource grid is referred to as a resource element (RE). The RE is a minimum physical resource, and includes one subcarrier in one orthogonal frequency division multiplexing (OFDM) symbol. An uplink time-frequency resource grid is similar to the downlink time-frequency resource grid. In the NR system, a basic time unit of downlink resource scheduling is one slot. Usually, one slot includes 12 or 14 time domain symbols in terms of time.

The PDCCH is transmitted in a control-resource set (CORESET), the CORESET includes a plurality of RBs in frequency domain and includes one symbol or several consecutive symbols in time domain, and the symbols may be located in any positions in a slot.

Figure 1C:
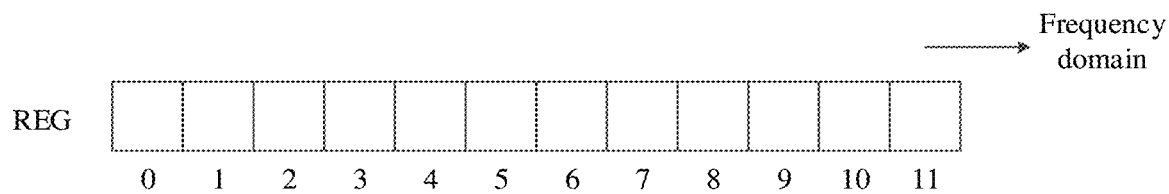
FIG. 1c is a schematic diagram of one REG.

A control channel element (CCE) is a basic unit constituting the PDCCH, and each CCE in the CORESET has one corresponding index number. A given PDCCH may include one CCE, two CCEs, four CCEs, eight CCEs, or 16 CCEs, and a quantity of CCEs constituting a PDCCH may be determined based on a DCI payload size and a needed coding rate. The quantity of CCEs constituting the PDCCH is also referred to as an aggregation level (AL). The network side device may adjust the aggregation level of the PDCCH based on a status of an actually transmitted radio channel, to implement link adaptive transmission. One CCE corresponds to six REGs (resource element group) in terms of a physical resource, and one REG occupies one OFDM symbol in time domain and occupies one RB in frequency domain. For this, refer to FIG. 1c.

Figure 1D:
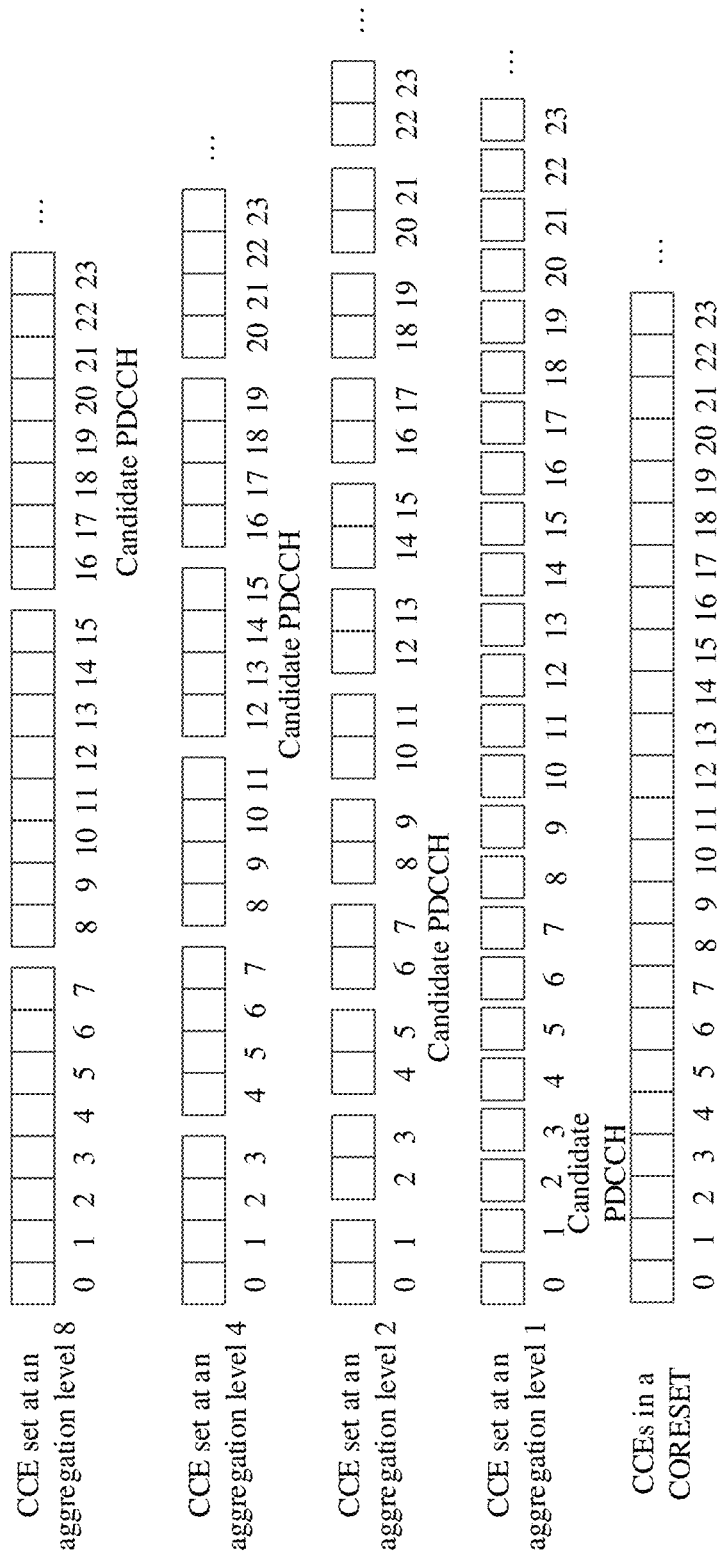
FIG. 1d is a schematic diagram of a search space.

A search space is a set of candidate PDCCHs at an aggregation level. Because an aggregation level of a PDCCH actually transmitted by the network side device is variable, and a specific aggregation level for sending the PDCCH is not notified to the terminal side device by using related signaling, the terminal side device needs to blindly detect the PDCCH at different aggregation levels. The PDCCH to be blindly detected is referred to as a candidate PDCCH, and there may be a plurality of candidate PDCCHs at an aggregation level. FIG. 1d illustrates the search space. The terminal side device decodes all candidate PDCCHs constituted by CCEs in the search space, and if cyclic redundancy check (CRC) succeeds, the terminal side device considers that content of the decoded PDCCHs is valid for the terminal side device, and the terminal side device can continue to process related information of the decoded PDCCHs.

In the NR system, to better control complexity of blindly detecting a downlink control channel, the network side device may configure one or more search space sets for the terminal side device. Each search space set includes a search space corresponding to one or more aggregation levels. In other words, one search space set may correspond to one or more aggregation levels, and one search space set may include a candidate PDCCH at the one or more aggregation levels.

Figure 1E:
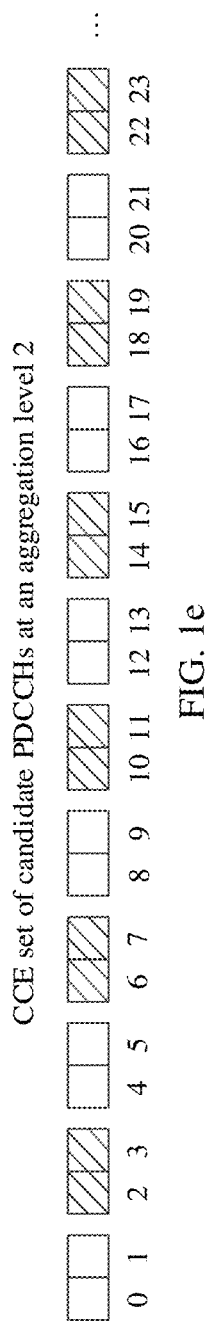
FIG. 1e is a schematic diagram of CCE index numbers of candidate PDCCHs in a CORESET.
Figure 1F:
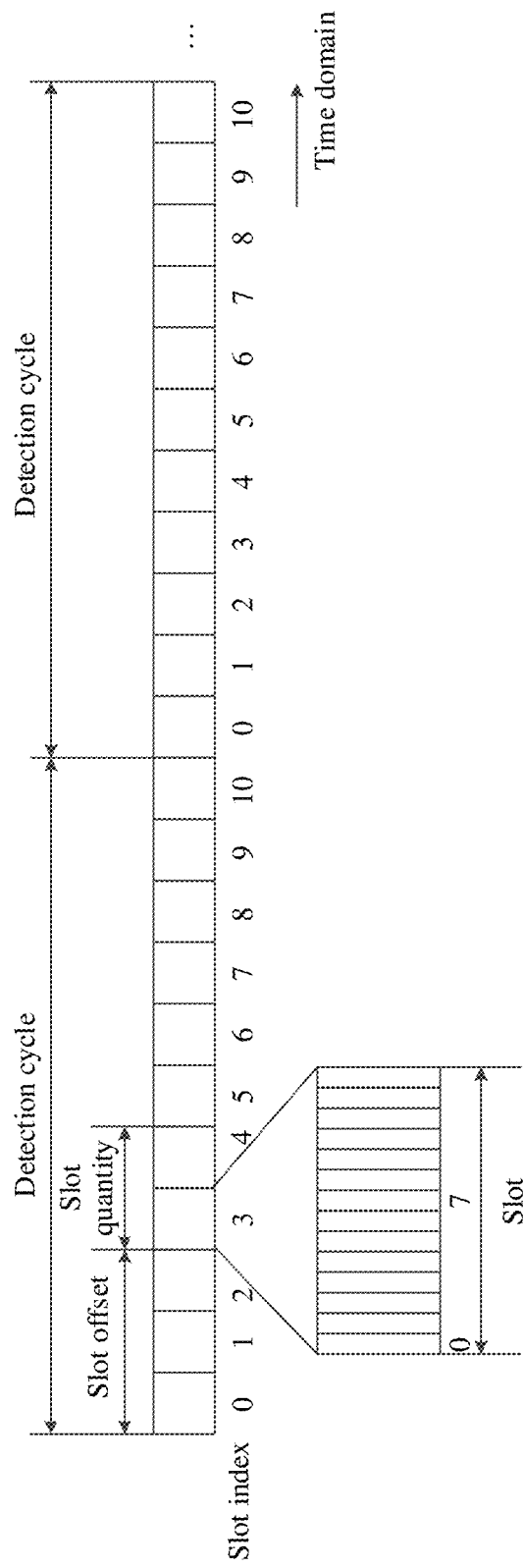
FIG. 1f is a schematic diagram in which a terminal side device detects a candidate PDCCH in a search space set at a specific time interval.

Further, when configuring the search space sets for the terminal side device, the network side device configures an index number for each search space set. The search space set includes candidate PDCCHs, and all the candidate PDCCHs are located in a corresponding CORESET. Therefore, the index number of the search space set is associated with an index number of the CORESET in which the candidate PDCCHs included in the search space set are located, and the CORESET associated with the search space set determines CCE indexes of the candidate PDCCHs of the search space set in the CORESET. For example, if the CORESET has 24 CCEs in total, and the search space set corresponds to six candidate PDCCHs at an aggregation level AL=2, for a CCE index number of each candidate PDCCH in the CORESET, refer to FIG. 1e. In FIG. 1e, a diagonal box indicates a candidate PDCCH.

In time domain, the terminal side device detects a candidate PDCCH in a search space set at a specific time interval. Therefore, some time domain information may be configured for each search space set, such as a detection cycle (namely, a time interval for detecting the search space set, and a unit of the time interval is slot), a slot offset (namely, an amount of slot offset between a time the detection cycle starts and a time the search space set is actually detected, and the amount of slot offset is less than a value of the detection cycle), a slot quantity (namely, a quantity of slots for continuously detecting the search space set, and the slot quantity is less than the value of the detection cycle), and a symbol position (namely, a position of a start symbol of a CORESET associated with the search space set in each slot). For ease of understanding, specific examples are used to describe meanings of the parameters. As shown in FIG. if, a detection cycle is 10 slots, a slot offset is three slots, a slot quantity is 2, a CORESET associated with a search space set is a CORESET occupying two symbols, and symbol positions are a symbol 0 and a symbol 7 in the slot. In this example, the terminal side device detects a candidate PDCCH of the search space set in the CORESET in symbols 0 and symbols 7 in a slot 3 and a slot 4 in each detection cycle of 10 slots, and the CORESET occupies two symbols in time domain.

The terminal side device may consume a large amount of power due to relatively high PDCCH detection complexity. Therefore, a monitoring capability corresponding to one slot may be set in the NR system. The monitoring capability corresponding to the slot may include: (1) a maximum quantity of PDCCH monitoring times of the terminal side device in the slot, and/or (2) a maximum value of a quantity of CCEs used by the terminal side device for channel estimation in the slot. For (1), a quantity of monitoring times is a quantity of monitored candidate PDCCHs. For example, if three candidate PDCCHs are configured at an aggregation level 2, and one type of DCI format or size needs to be detected for each candidate PDCCH, a quantity of monitoring times at the aggregation level 2 is 3*1=3. For example, the maximum quantity of PDCCH monitoring times in the slot may be a maximum quantity of monitoring times that the terminal side device can bear in the slot. For (2), DCI may be affected by a radio channel environment in a transmission process, greatly affecting transmission performance. Therefore, before monitoring, the terminal side device needs to perform channel estimation on a pilot inserted in a PDCCH, to counteract impact of a radio channel on signal transmission, and recover a transmitted signal of the network side device as accurately as possible. Because a PDCCH resource is allocated in a minimum unit of CCE, the terminal side device also performs channel estimation in the unit of CCE. For example, the maximum value of the quantity of CCEs used by the terminal side device for channel estimation in the slot is a maximum quantity of CCEs that can be used by the terminal side device for channel estimation in the slot.

Considering that a URLLC service is defined in the NR system, to meet a latency requirement of the URLLC service, a time subunit, for example, a span, which may also be referred to as a monitoring span, is introduced in the NR system. For ease of description, the time subunit is referred to as a span in the embodiments of this application.

A length of each span is at least Y consecutive symbols, and Y is an integer greater than 0. The Y consecutive symbols are consecutive in time domain (where an interval more than one symbol does not exist). Currently, the span is subject to the following rules:

(1) No overlapping symbol can exist between spans. In other words, one symbol cannot belong to two spans.
(2) Each span is included in one separate slot. In other words, the span cannot cross a boundary of the slot.
(3) Each PDCCH monitoring occasion (MO) is completely included in one span. In other words, one MO cannot cross a boundary of the span. The MO herein indicates duration during which one terminal side device blindly detects a PDCCH, and is jointly determined by using one monitoring start position and a CORESET bound to this monitored search space set. For example, a start position at which the terminal side device monitors one search space set is the first symbol in one slot, and the search space set is bound to one CORESET with a length of three symbols. Therefore, an MO for monitoring the search space set is the first three symbols, namely, the first symbol, the second symbol, and the third symbol, in the slot in which the MO is located.
(4) For all PDCCH MOs in one slot, a quantity of different start symbols of spans cannot exceed floor (14/X), where X is a minimum value of a quantity of reporting capabilities of the terminal side device, and floor( ) indicates a rounding down operation.
(5) A quantity of different start symbols of different PDCCH MOs in one slot cannot exceed 7.
(6) In a secondary serving cell, a quantity of different start symbols of PDCCH MOs in a half-slot cannot exceed 4.

For example, span division in a slot may be preset by a protocol, or configured by the base station by using a higher layer parameter, or self-determined by the terminal side device according to a rule preset by a protocol and based on a higher layer parameter. One span includes several symbols. All spans in one slot may have a same length or different lengths. For example, in one slot, some spans each have a length of seven symbols, and some spans each have a length of one or two symbols.

Based on this, the embodiments of this application mainly study how to determine a monitoring capability corresponding to a time subunit (for example, a span) after the time subunit is introduced, to facilitate the terminal side device in monitoring a PDCCH in the time subunit.

The technical solutions provided in the embodiments of this application are described below with reference to the accompanying drawings.

Figure 2:
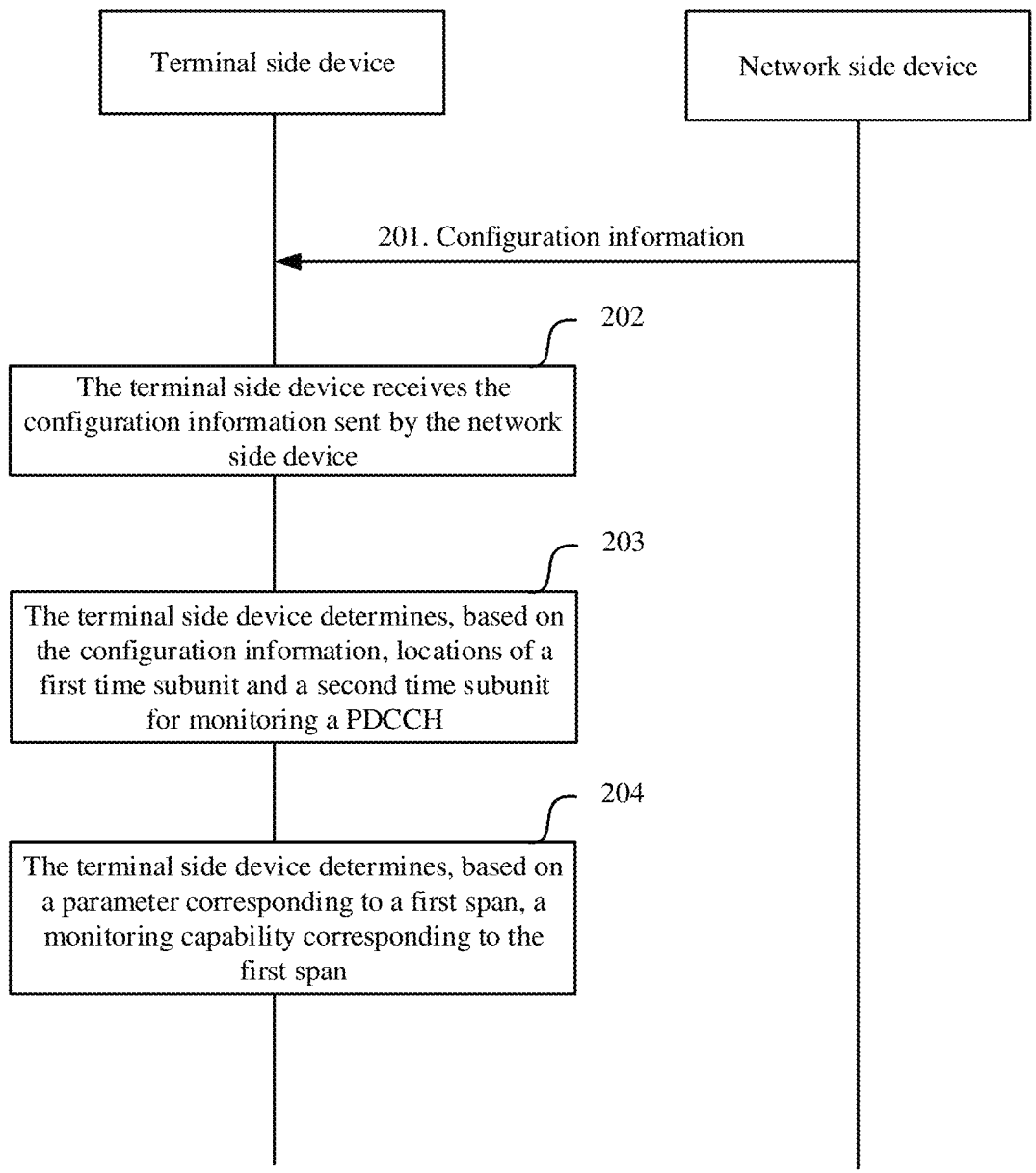
FIG. 2 is a schematic flowchart corresponding to a communication method according to an embodiment of this application.

An embodiment of this application provides a communication method. FIG. 2 is a schematic flowchart corresponding to the method. In the following description process, for example, the method is applied to the system architecture shown in FIG. 1a. In addition, the method may be performed by two communications apparatuses. The two communications apparatuses are, for example, a first communications apparatus and a second communications apparatus. The first communications apparatus may be a network side device or a communications apparatus that can support the network side device in implementing functions needed for the method, and certainly may alternatively be another communications apparatus such as a chip or a chip system. The second communications apparatus may be a terminal side device or a communications apparatus that can support the terminal side device in implementing functions needed for the method, and certainly may alternatively be another communications apparatus such as a chip or a chip system. For ease of description, in the following, for example, the method is performed by a network side device and a terminal side device; in other words, for example, the first communications apparatus is the network side device and the second communications apparatus is the terminal side device. If this embodiment is applied to the system architecture shown in FIG. 1a, the network side device described below for performing the embodiment shown in FIG. 2 may be the network side device in the system architecture shown in FIG. 1a, and the terminal side device described below for performing the embodiment shown in FIG. 2 may be the terminal side device in the system architecture shown in FIG. 1a.

As shown in FIG. 2, the method includes the following steps.

Step 201: The network side device sends configuration information to the terminal side device, where the configuration information is used to indicate a position for monitoring a PDCCH.

Correspondingly, in step 202, the terminal side device receives the configuration information sent by the network side device.

Step 203: The terminal side device determines, based on the configuration information, positions of a first time subunit and a second time subunit for monitoring the PDCCH.

For example, a time unit described in this embodiment of this application may be a slot; and a time subunit may be a time granularity shorter than the slot, and may be, for example, several consecutive symbols, a span, a half-slot, or a sub-slot unit. In the following, an example in which the time subunit is a span is mainly used for description. For example, the first time subunit is a first span, and the second time subunit is a second span.

In this embodiment of this application, that the configuration information is used to indicate a position for monitoring a PDCCH may include: The configuration information is used to indicate a time domain position and a frequency domain position for monitoring the PDCCH. In the following, an example in which the configuration information is used to indicate the time domain position for monitoring the PDCCH is mainly used for description.

In an example, the configuration information may include at least one of the following: (1) a detection cycle, a slot offset, and a slot quantity of one or more search space sets; and (2) a quantity b of occupied symbols and positions of O start symbols of a CORESET associated with the one or more search space sets. The above is merely an example, and the PDCCH configuration information may further include other information. This is not described herein by using an example.

For descriptions of (1), refer to the descriptions above. Details are not described herein again. For (2), the quantity b of occupied symbols and the positions of the O start symbols of the CORESET are used to determine a position of a time domain symbol occupied by each of O blind detection occasions, each of the O blind detection occasions occupies b symbols, and b is an integer greater than 0. For example, if the CORESET occupies three symbols and positions of two start symbols of the CORESET are respectively the first symbol and the seventh symbol, b=3, O=2, positions of start symbols of the two blind detection occasions are respectively the first symbol and the seventh symbol, and each blind detection occasion occupies three time domain symbols; in other words, the first blind detection occasion is the first symbol to the third symbol, and the second blind detection occasion is the seventh symbol to the ninth symbol.

Figure 3A:
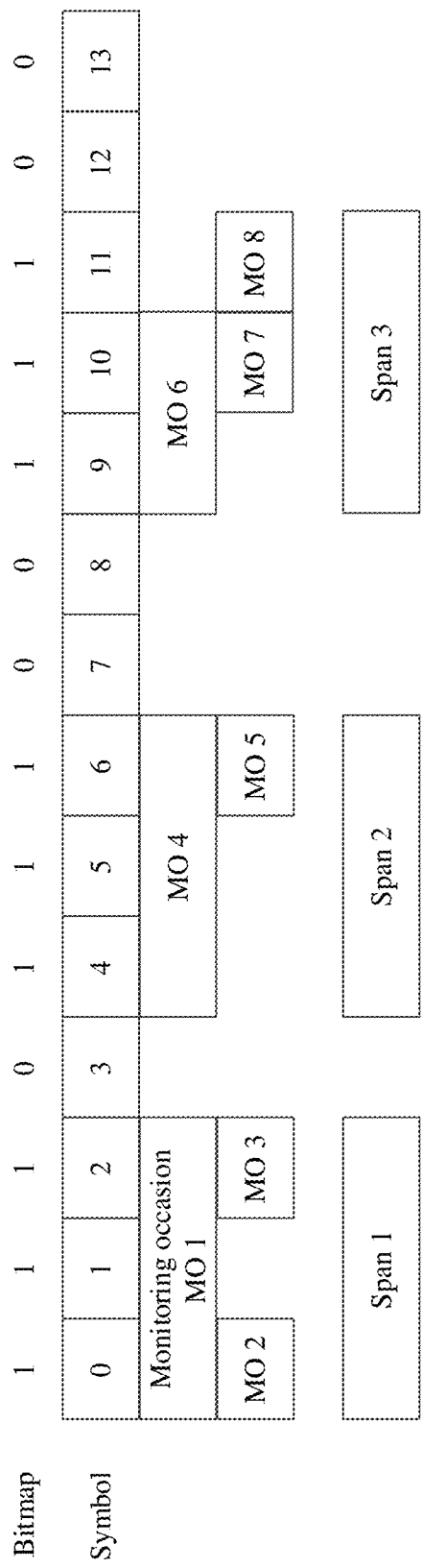
FIG. 3a is a schematic diagram of positions of spans included in one slot according to an embodiment of this application.

After receiving the configuration information, the terminal device may determine a bitmap of the PDCCH based on the configuration information. The bitmap of the PDCCH is used to indicate a position of a start symbol of a CORESET in a slot in which the PDCCH needs to be monitored. For example, the bitmap of the PDCCH is 11101110011100, and a symbol corresponding to a bit with a value 1 in the bit map is a start symbol of the CORESET. As shown in FIG. 3a, positions of spans included in one slot may be obtained based on the bitmap. For example, a time domain length of one span or a quantity of consecutive symbols included in one span is max{max (CORESET time domain length), min(Y)}. For Y, refer to the following descriptions. Herein, assuming that one span includes three consecutive symbols, the terminal side device determines a start position of the first span based on a position of the first bit state "1" in the bitmap, and determines a position (which may be a time domain position) of the first span by adding the time domain length of the span to the start position of the first span; the terminal side device determines a start position of the second span based on a closest bit state "1" that does not belong to the first span in the bitmap, and determines a position of the second span by adding the time domain length of the span to the start position of the second span; and the terminal side device determines a start position of the third span based on a closest bit state "1" that does not belong to the first span or the second span in the bitmap, and may determine a position of the third span by adding the time domain length of the span to the start position of the third span. A finally determined pattern may be shown in FIG. 3a. Further, a monitoring occasion included in each span may also be determined based on the configuration information, and eight monitoring occasions (an MO 1 to an MO 8) illustrated in FIG. 3a are merely an example, and other possible monitoring occasions may alternatively be included.

For example, in step 201, the network side device may send the configuration information to the terminal side device by using higher layer signaling. The higher layer signaling may be signaling sent from a higher protocol layer, and the higher protocol layer is at least one protocol layer above a physical layer. The higher protocol layer may include at least one of the following protocol layers: a medium access control (MAC) layer, a radio link control (RLC) layer, a packet data convergence protocol (PDCP) layer, a radio resource control (RRC) layer, and a non-access stratum.

Step 204: The terminal side device determines, based on a parameter corresponding to the first span, a monitoring capability corresponding to the first span.

For example, the parameter corresponding to the first span includes at least one of the following: a first time domain interval between a start position of the first span and a start position of the second span; a time domain length of the first span; and a second time domain interval between the first span and the second span. The second span may be located behind the first span (in this case, the second time domain interval between the first span and the second span may be understood as a time domain interval between an end position of the first span and the start position of the second span), or the second span may be located in front of the first span (in this case, the second time domain interval between the first span and the second span may be understood as a time domain interval between an end position of the second span and the start position of the first span). For example, in the span 1 pattern shown in FIG. 3a, the first span is a span 1 and the second span is a span 2; or the first span is a span 2 and the second span is a span 1.

In this embodiment of this application, considering that an empty span may exist, in an example, the second span may be a non-empty span that is located behind the first span and closest to the first span; or the second span may be a non-empty span that is located in front of the first span and closest to the first span. A search space set exists in the non-empty span. In other words, in a time unit (namely, a slot) in which the non-empty span is located, the non-empty span includes a position for monitoring the PDCCH. Correspondingly, no search space set exists in the empty span. In other words, in a slot in which the empty span is located, the empty span includes no position for monitoring the PDCCH.

Figure 3B:
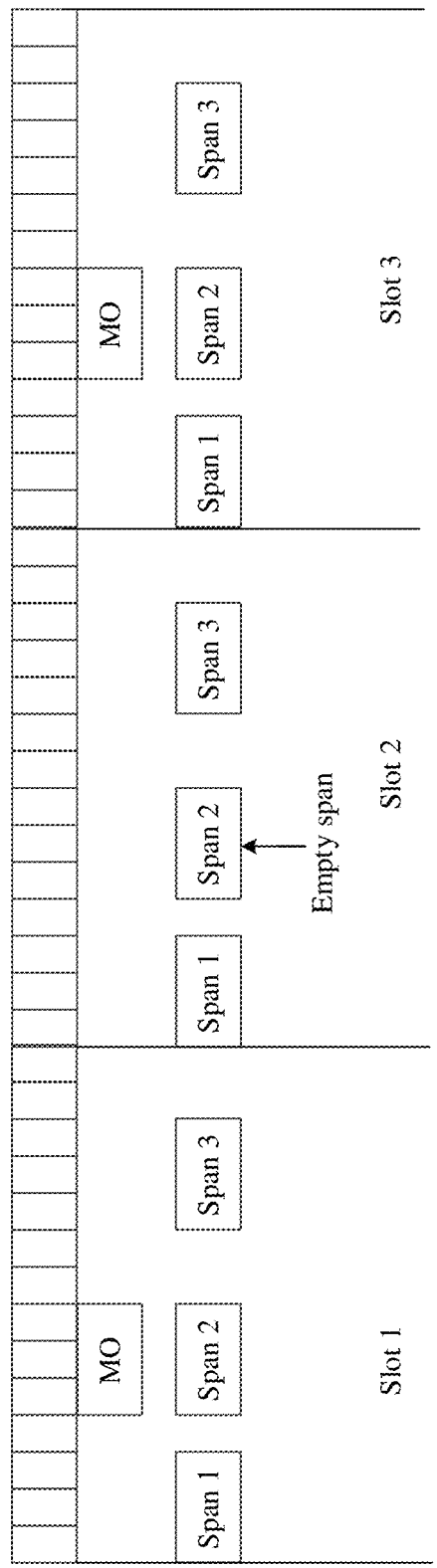
FIG. 3b is a schematic diagram of an empty span according to an embodiment of this application.

The following describes the empty span and the non-empty span. For example, when determining a span pattern based on the configuration information, the terminal side device usually determines the span pattern by concentrating, in one slot, monitoring occasions that may occur in all slots, so that all the slots are consistent in the span pattern. However, considering that all search space sets may have different detection cycles, no search space exists in a span or some spans in a slot, and then no monitoring occasion exists in the span(s) of the slot. For example, as shown in FIG. 3b, a detection cycle of a search space set 1 is two slots, and monitoring occasions of the search space set 1 are located in a span 2 of a slot 1, a span 2 of a slot 3, and a span 2 of a subsequent slot (for example, a slot 5). In other words, no monitoring occasion occurs in a span 2 of a slot 2. Therefore, the span 2 of the slot 2 may be understood as an empty span, and the span 2 of the slot 1 and the span 2 of the slot 3 may be understood as non-empty spans.

It should be noted that, only the example in which the time subunit is a span is used above to describe the empty span and the non-empty span. In this embodiment of the present invention, for an empty time subunit, refer to the descriptions of the empty span, and for a non-empty time subunit, refer to the descriptions of the non-empty span. For example, no search space set exists in the empty time subunit, and a search space set exists in the non-empty time subunit.

For example, if the first span is a span 1 in FIG. 3a and the second span is a span 2 in FIG. 3a, the first time domain interval (which may be denoted as X') between the start position of the first span and the start position of the second span is 4, the time domain length (which may be denoted as Y) of the first span is 3, and the second time domain interval (which may be denoted as Z') between the first span and the second span is 1. For example, if the first span is a span 2 in FIG. 3a and the second span is a span 1 in FIG. 3a, the first time domain interval (X') between the start position of the first span and the start position of the second span is 4, the time domain length (Y') of the first span is 3, and the second time domain interval (Z') between the first span and the second span is 1.

In this embodiment of this application, the terminal side device may determine, in a plurality of implementations based on the parameter corresponding to the first span, the monitoring capability corresponding to the first span. In a possible implementation (referred to as Implementation 1), the terminal side device may obtain at least one monitoring parameter supported by the terminal side device and a monitoring capability corresponding to the at least one monitoring parameter, and determine a target monitoring parameter that matches the parameter corresponding to the first span from the at least one monitoring parameter, and then determine, based on a monitoring capability corresponding to the target monitoring parameter, the monitoring capability corresponding to the first span.

For example, the monitoring parameter may include a minimum time domain interval (which may be denoted as X) between start positions of two adjacent spans located in a same time unit, and/or a maximum time domain length (which may be denoted as Y) of each span in the time unit. For example, the monitoring parameter includes X and Y, and it may be understood that the monitoring parameter means that a monitoring occasion in Y symbols needs to be processed by using at least a time length of X symbols. For example, the monitoring parameter may include X and Y. Table 1 lists an example of three monitoring parameters supported by the terminal side device.

TABLE 1

Example of monitoring parameters supported by the terminal side device

| Monitoring parameter index | X | Y |
|---|---|---|
| Monitoring parameter 1 | 2 | 2 |
| Monitoring parameter 2 | 4 | 3 |
| Monitoring parameter 3 | 7 | 3 |

A span pattern corresponding to the monitoring parameter 1, the monitoring parameter 2, and the monitoring parameter 3 in Table 1 may be shown in FIG. 3b. It should be noted that, FIG. 3c illustrates a span pattern in a worst scenario corresponding to all the monitoring parameters. The monitoring parameter 1 is used as an example. The monitoring parameter 1 means that a monitoring occasion in two symbols needs to be processed by using at least a time length of two symbols; however, in the worst scenario, a monitoring occasion in two symbols is processed by using a time length of only two symbols.

In this embodiment of this application, the monitoring parameter 1 is used as an example. A minimum time domain interval (which may be denoted as Z) between start positions of two adjacent spans located in a same time unit may be obtained based on X and Y included in the monitoring parameter 1. Referring to FIG. 3c, it may be learned, based on X and Y in the monitoring parameter 1, that Z is 0; it may be learned, based on X and Y in the monitoring parameter 2, that Z is 1; and it may be learned, based on X and Y in the monitoring parameter 1, that Z is 4.

For example, the terminal side device may report the monitoring parameter supported by the terminal side device and the monitoring capability corresponding to the monitoring parameter to the network side device, and correspondingly, the network side device may determine the configuration information based on the monitoring parameter supported by the terminal side device and the monitoring capability corresponding to the monitoring parameter.

The following separately describes (1) determining, by the terminal side device, the target monitoring parameter and (2) determining, by the terminal side device based on the monitoring capability corresponding to the target monitoring parameter, the monitoring capability corresponding to the first span.

(1) The terminal side device may determine the target monitoring parameter in a plurality of manners, and the following describes several possible manners.

Manner 1: The terminal side device may determine the target monitoring parameter based on X'.

For example, the terminal side device may obtain a mapping relationship between X' and X. Table 2 lists an example of the mapping relationship between X' and X.

TABLE 2

Example of the mapping relationship between X' and X

| X  | 2 |   | 2 or 4 |   |   |   |   | 2, 4, or 7 |    |    |
|----|---|---|--------|---|---|---|---|------------|----|----|
| X' | 2 | 3 | 4      | 5 | 6 | 7 | 8 | 9          | 10 | 11 | 12 |

As listed in Table 2, if X' is 2 or 3, corresponding X is 2; if X' is 4, 5, or 6, corresponding X is 2 or 4; and if X' is 7, 8, 9, 10, 11, or 12, corresponding X is 2, 4, or 7.

In this way, after determining, based on the mapping relationship between X' and X, X corresponding to X', the terminal side device may determine the target monitoring parameter based on X corresponding to X'. For example, if X' is 3 and corresponding X is 2, the target monitoring parameter is (2, 2). For another example, if X' is 5 and corresponding X is 2 or 4, the target monitoring parameter includes (2, 2) or (4, 3).

Manner 2: The terminal side device may determine the target monitoring parameter based on X' and Y'.

For example, after obtaining a mapping relationship between X' and X (as listed in Table 3) and determining, based on the mapping relationship between X' and X, X corresponding to X', the terminal side device may further determine, based on a mapping relationship between Y' and Y (for example, Y is less than or equal to Y'), Y corresponding to Y', and then determine the target monitoring parameter based on X corresponding to X' and Y corresponding to Y'. For example, if X' is 5, Y' is 2, X corresponding to X' is 2 or 4, and Y corresponding to Y is 2, it may be determined that the target monitoring parameter is (2, 2). For another example, if X' is 7, Y' is 2, X corresponding to X' is 2, 4, or 7, and Y corresponding to Y' is 2, it may be determined that the target monitoring parameter includes (2, 2) or (4, 3).

Manner 3: The terminal side device may determine the target monitoring parameter based on Z'.

For example, the terminal side device may obtain a mapping relationship between Z' and Z (for example, Z is less than or equal to Z'), and then after determining, based on the mapping relationship between Z' and Z, Z corresponding to Z', determine the target monitoring parameter based on Z corresponding to Z'. For example, if Z' is 0 and Z corresponding to Z' is 0, it may be determined that the target monitoring parameter is (2, 2).

Manner 4: The terminal side device may determine the target monitoring parameter based on X' (where specific implementation is different from that of Manner 1).

For example, the terminal side device may determine an absolute value of a difference between X and X', and then obtain a minimum absolute value, and determine the target monitoring parameter based on X corresponding to the minimum absolute value. For example, if X' is 3, an absolute value of a difference between X' and X is 1 for the monitoring parameter 1, an absolute value of a difference between X' and X is 1 for the monitoring parameter 2, and an absolute value of a difference between X' and X is 4 for the monitoring parameter 3. In this case, the target monitoring parameter includes (2, 2) or (4, 3).

It should be noted that, only the four possible manners are described above, and other possible manners may alternatively exist in other possible embodiments. For example, the terminal side device may determine the target monitoring parameter based on Y'. For example, the terminal side device may determine an absolute value of a difference between Y and Y', and then obtain a minimum absolute value, and determine the target monitoring parameter based on Y corresponding to the minimum absolute value.

(2) The terminal side device may determine, in a plurality of manners based on the monitoring capability corresponding to the target monitoring parameter, the monitoring capability corresponding to the first span.

For example, a monitoring capability corresponding to each monitoring parameter supported by the terminal side device may include: a maximum value of a quantity of PDCCH monitoring times of the terminal side device in one span, and/or a maximum value of a quantity of CCEs used by the terminal side device for channel estimation in one span. For example, the monitoring capability corresponding to each monitoring parameter includes the maximum value (which may be denoted as C) of the quantity of CCEs used by the terminal side device for channel estimation in the span. Table 3 lists three monitoring parameters supported by the terminal side device and monitoring capabilities corresponding to the three monitoring parameters, where the three monitoring parameters and the monitoring capabilities corresponding to the three monitoring parameters are reported by the terminal side device to the network side device.

TABLE 3

Example of monitoring capabilities corresponding to monitoring parameters

| Monitoring parameter index | X | Y | Monitoring capability |
|---|---|---|---|
| Monitoring parameter 1 | 2 | 2 | C1 |
| Monitoring parameter 2 | 4 | 3 | C2 |
| Monitoring parameter 3 | 7 | 3 | C3 |

In Table 3, the monitoring capability C3 corresponding to the monitoring parameter 3 indicates a maximum value of a quantity of CCEs used by the terminal side device for channel estimation in a span-1a and a span-1b. The monitoring capability C2 corresponding to the monitoring parameter 2 indicates a maximum value of a quantity of CCEs used by the terminal side device for channel estimation in a span-2a, a span-2b, and a span-2c. The monitoring capability C1 corresponding to the monitoring parameter 1 indicates a maximum value of a quantity of CCEs used by the terminal side device for channel estimation in a span-3a, a span-3b, a span-3c, a span-3d, a span-3e, a span-3f, and a span-3g. In Table 3, an example in which one monitoring parameter corresponds to one monitoring capability is used for description. In specific implementation, one monitoring parameter may alternatively correspond to a plurality of monitoring capabilities.

For example, the monitoring capability may be further related to a subcarrier spacing, and a same monitoring parameter may correspond to different monitoring capabilities for different subcarrier spacings. Table 4 lists another example of monitoring capabilities corresponding to monitoring parameters.

TABLE 4

Another example of monitoring capabilities corresponding to monitoring parameters

| Monitoring parameter index | X | Y | Monitoring capability | | | |
|---|---|---|---|---|---|---|
| | | | $\mu = 0$ | $\mu = 1$ | $\mu = 2$ | $\mu = 3$ |
| Monitoring parameter 1 | 2 | 2 | C1 | . . . | . . . | . . . |
| Monitoring parameter 2 | 4 | 3 | C2 | . . . | . . . | . . . |
| Monitoring parameter 3 | 7 | 3 | C3 | . . . | . . . | . . . |

$\mu=0$ indicates a subcarrier spacing of 15 KHz, $\mu=1$ indicates a subcarrier spacing of 30 KHz, $\mu=2$ indicates a subcarrier spacing of 60 KHz, and $\mu=3$ indicates a subcarrier spacing of 120 KHz. Certainly, other subcarrier spacings may alternatively exist. This is not specifically limited. When $\mu=0$, a monitoring capability corresponding to each monitoring parameter may include one or more monitoring capabilities. This is not specifically limited. For this example, it should be noted that, when the terminal side device determines the monitoring capability of the first span based on the monitoring capability corresponding to the target monitoring parameter, for example, if a subcarrier spacing corresponding to the first span is 15 KHz, the terminal side device determines the monitoring capability of the first span based on a monitoring capability corresponding to the target monitoring parameter (when $\mu=0$).

When the terminal side device determines, based on the monitoring capability corresponding to the target monitoring parameter, the monitoring capability corresponding to the first span, if the target monitoring parameter corresponds to one monitoring capability, the terminal side device may directly determine the monitoring capability corresponding to the target monitoring parameter as the monitoring capability corresponding to the first span. For example, if the target monitoring parameter is (2, 2) and a monitoring capability corresponding to (2, 2) is C1, the terminal side device may determine that the monitoring capability corresponding to the first span is C1.

If the target monitoring parameter corresponds to a plurality of monitoring capabilities, in an example, the terminal side device may directly determine that a minimum monitoring capability in the plurality of monitoring capabilities is the monitoring capability corresponding to the first span. For example, if the target monitoring parameter is (2, 2) and monitoring capabilities corresponding to (2, 2) are C1a and C1b (where C1a is less than C1b), the terminal side device may determine that the monitoring capability corresponding to the first span is C1a. For another example, if the target monitoring parameter includes (2, 2) or (4, 3), a monitoring capability corresponding to (2, 2) is C1, and a monitoring capability corresponding to (4, 3) is C2 (where C1 is less than C2), the terminal side device may determine that the monitoring capability corresponding to the first span is C1.

In another example, the terminal side device may determine whether the first span meets a first condition; and if the first span meets the first condition, may determine that a maximum monitoring capability in the plurality of monitoring capabilities is the monitoring capability corresponding to the first span; or if the first span does not meet the first condition, may determine that a minimum monitoring capability in the plurality of monitoring capabilities is the monitoring capability corresponding to the first span. The first condition includes: a common search space (CSS) set and/or a search space set scheduled based on a time unit granularity exist/exists in the first span; and/or the time domain interval between the start position of the first span and the start position of the second span is greater than a first threshold.

The following describes the content included in the first condition:

(1) The CSS set exists in the first span. When the CSS set exists in the first time unit, because a CSS includes DCI for scheduling common information, the terminal side device needs to monitor the CSS (however, the terminal side device may choose not to monitor a user specific search space (USS), for example, when a monitoring capability of the terminal side device is insufficient to monitor all CSSs and USSs, the terminal side device may choose not to monitor one of the USSs), where the common information is, for example, a system message, a paging message, or random access information. Considering this, a relatively strong monitoring capability may be configured.

(2) The search space set scheduled based on the time unit granularity exists in the first span. For a search space set scheduled based on a time unit, to ensure that the PDCCH can be obtained in time, the terminal side device needs to monitor the search space set scheduled based on the time unit (however, the terminal side device may choose to monitor or not to monitor a search space set scheduled based on a time granularity smaller than the time unit, because the search space set may appear in the first span and a next span, and the terminal side device can monitor the search space set in the next span even if the terminal side device does not monitor the search space set in the first span). Therefore, a relatively strong monitoring capability may be configured.

(3) The time domain interval (X') between the start position of the first span and the start position of the second span is greater than the first threshold. This indicates that X' is sufficiently large; in other words, there is sufficient time to process a monitoring occasion in Y' symbols. Therefore, a relatively strong monitoring capability may be configured. The first threshold may be set by a person skilled in the art based on an actual need, and is not specifically limited. In an example, the first threshold may be related to the monitoring parameter reported by the terminal side device to the network side device. For example, if the monitoring parameter reported by the terminal side device to the network side device includes (2, 2), (4, 3), and (7, 3), the first threshold may be a value greater than 7. For example, the first threshold is 10. Alternatively, the first threshold may be related to the monitoring capability supported by the terminal side device. Alternatively, the first threshold is a value predetermined by a protocol, or one of a plurality of values predetermined by a protocol. For example, the terminal side device may report the first threshold to the network side device. Alternatively, the terminal side device and the network side device may pre-agree on a rule for determining the first threshold. In this case, the terminal side device may not report the first threshold to the network side device.

The foregoing content describes an example (for example, Implementation 1) of a manner in which the terminal side device determines a monitoring capability corresponding to one span. As a whole, in an example (referred to as Example 1), the terminal side device may determine, in the foregoing manner, a monitoring capability corresponding to each span (which may be a non-empty span). For example, if the first span is the first span whose monitoring capability needs to be determined, the terminal side device may sequentially determine, in the foregoing manner, monitoring capabilities corresponding to other spans. For example, as shown in FIG. 3b, the terminal side device may determine, in Implementation 1 (in this case, a span 1 in a slot 1 is the first span, and a span 2 in the slot 1 is the second span), a monitoring capability corresponding to the span 1 in the slot 1, determine, in Implementation 1 (in this case, the span 2 in the slot 1 is the first span, and a span 3 in the slot 1 is the second span), a monitoring capability corresponding to the span 2 in the slot 1, determine, in Implementation 1 (in this case, the span 3 in the slot 1 is the first span, and a span 1 in a slot 2 is the second span), a monitoring capability corresponding to the span 3 in the slot 1, determine, in Implementation 1 (in this case, the span 1 in the slot 2 is the first span, and a span 3 in the slot 2 is the second span), a monitoring capability corresponding to the span 1 in the slot 2, and determine, in Implementation 1 (in this case, the span 3 in the slot 2 is the first span, and a span 1 in a slot 3 is the second span), a monitoring capability corresponding to the span 3 in the slot 2. By analogy, monitoring capabilities corresponding to other spans may be determined.

In another example (referred to as Example 2), the terminal side device may receive indication information sent by the network side device. The indication information may indicate a monitoring capability corresponding to a span (for example, a span-a). The span-a may be a span pre-agreed on by the terminal side device and the network side device. For example, the span-a may be the first span whose monitoring capability needs to be determined, or may be another span whose monitoring capability needs to be determined. This is not specifically limited. For example, the terminal side device may report the monitoring capability supported by the terminal side device to the network side device, and the monitoring capability indicated by the indication information may be one of one or more monitoring capabilities supported by the terminal side device.

For example, if the span-a is the first span whose monitoring capability needs to be determined, the terminal side device may determine, based on the indication information, the monitoring capability corresponding to the span-a, and further, may sequentially determine, in the foregoing manner, monitoring capabilities corresponding to other spans. For example, as shown in FIG. 3b, if the span-a is a span 1 in a slot 1, the terminal side device may determine, based on the indication information, a monitoring capability corresponding to the span 1 in the slot 1; and determine, in Implementation 1 (in this case, a span 2 in the slot 1 is the first span, and a span 3 in the slot 1 is the second span), a monitoring capability corresponding to the span 2 in the slot 1, determine, in Implementation 1 (in this case, the span 3 in the slot 1 is the first span, and a span 1 in a slot 2 is the second span), a monitoring capability corresponding to the span 3 in the slot 1, determine, in Implementation 1 (in this case, the span 1 in the slot 2 is the first span, and a span 3 in the slot 2 is the second span), a monitoring capability corresponding to the span 1 in the slot 2, and determine, in Implementation 1 (in this case, the span 3 in the slot 2 is the first span, and a span 1 in a slot 3 is the second span), a monitoring capability corresponding to the span 3 in the slot 2. By analogy, monitoring capabilities corresponding to other spans may be determined.

For another example, as shown in FIG. 3b, if the span-a is a span 1 in a slot 3, the terminal side device may determine, based on the indication information, a monitoring capability corresponding to the span 1 in the slot 3; and then, for all spans in front of the span 1 in the slot 3, the terminal side device may sequentially determine, from back to front in Implementation 1, monitoring capabilities corresponding to all the spans, and for all spans behind the span 1 in the slot 3, the terminal side device may sequentially determine, from front to back in Implementation 1, monitoring capabilities corresponding to all the spans. For example, for all the spans in front of the span 1 in the slot 3, the terminal side device may determine, in Implementation 1 (in this case, a span 3 in a slot 2 is the first span, and the span 1 in the slot 3 is the second span), a monitoring capability corresponding to the span 3 in the slot 2, and determine, in Implementation 1 (in this case, a span 1 in the slot 2 is the first span, and the span 3 in the slot 2 is the second span), a monitoring capability corresponding to the span 1 in the slot 2. By analogy, monitoring capabilities corresponding to other spans may be determined. For all the spans behind the span 1 in the slot 3, the terminal side device may determine, in Implementation 1 (in this case, a span 2 in the slot 3 is the first span, and the span 1 in the slot 3 is the second span), a monitoring capability corresponding to the span 2 in the slot 3, and determine, in Implementation 1 (in this case, a span 3 in the slot 3 is the first span, and the span 2 in the slot 3 is the second span), a monitoring capability corresponding to the span 3 in the slot 3. By analogy, monitoring capabilities corresponding to other spans may be determined.

Example 1 and Example 2 describe how the terminal side device determines the monitoring capability corresponding to each span. In this embodiment of this application, when the terminal side device performs monitoring, in a possible case, the terminal side device may perform monitoring in each span based on the determined monitoring capability corresponding to each span.

In another possible case, after determining, in the manner of Example 1 or Example 2, a monitoring capability corresponding to each span in one slot, the terminal side device may determine a target monitoring capability based on the monitoring capability corresponding to each span in the slot, and then perform monitoring in each span in the slot based on the target monitoring capability, or may perform monitoring in each span in a plurality of slots based on the target monitoring capability. The target monitoring capability may be a minimum monitoring capability in monitoring capabilities corresponding to all spans in the slot, and is not specifically limited. In this case, when one slot includes a plurality of spans, usually, monitoring capabilities of most of the spans are basically the same or slightly different, and a monitoring capability of only an individual span is relatively large. Considering this, to improve processing convenience of the terminal side device, the terminal side device may perform monitoring in all the spans in the slot based on a same monitoring capability (for example, a minimum monitoring capability corresponding to the plurality of spans); and when the monitoring capability is the minimum monitoring capability, it can be effectively ensured that monitoring is performed in each time subunit within a capability range of the terminal side device.

In still another possible case, a slot (for example, a slot 1) is used as an example. After determining monitoring capabilities corresponding to all spans in the slot 1, the terminal side device may select a minimum monitoring capability in the monitoring capabilities corresponding to all the spans as a monitoring capability corresponding to all the spans in the slot 1, or may select a maximum monitoring capability in the monitoring capabilities corresponding to all the spans as a monitoring capability corresponding to all the spans in the slot 1. In other words, after determining target monitoring parameters (including, for example, X and Y) corresponding to all the spans in the slot 1, the terminal side device may use a target monitoring parameter with smallest X in the target monitoring parameters as a target monitoring parameter corresponding to all the spans, or use a target monitoring parameter with largest X in the target monitoring parameters as a target monitoring parameter corresponding to all the spans; and then determine, based on the target monitoring parameter corresponding to all the spans, a monitoring capability corresponding to all the spans. For example, if the target monitoring parameter corresponding to all the spans corresponds to one monitoring capability, the terminal side device may determine the monitoring capability as the monitoring capability corresponding to all the spans; or if the target monitoring parameter corresponding to all the spans corresponds to a plurality of monitoring capabilities, the terminal side device may determine a maximum monitoring capability or a minimum monitoring capability in the plurality of monitoring capabilities as the monitoring capability corresponding to all the spans. For ease of description, the monitoring capability corresponding to all the spans in the slot 1 may be denoted as C.

In this case, assuming that one slot does not correspond to one monitoring capability upper limit value, the network side device may ensure that the following relationship is configured: $N \cdot C \geq P'$, where $P'$ is a total monitoring capability of the terminal device in the slot.

Assuming that one slot corresponds to one monitoring capability upper limit value, and different slots may correspond to a same monitoring capability upper limit value (in this case, the monitoring capability upper limit value may be denoted as P), or may correspond to different monitoring capability upper limit values (in this case, a monitoring capability upper limit value corresponding to a slot may be denoted as $P_n$, where n is a slot index number; for example, $P_1$ indicates a monitoring capability upper limit value corresponding to a slot with a slot index number 1). For example, a slot 1 has N spans, a monitoring capability corresponding to each span is C, and the network side device ensures that the following relationship is configured: $N \cdot C \leq P$. For example, when $N \cdot C < P$, an extra monitoring capability $P - N \cdot C$ may be counted into a monitoring capability corresponding to the first span in the slot 1; in other words, the monitoring capability corresponding to the first span is $C + P - N \cdot C$, and a monitoring capability corresponding to another span in the slot 1 is still C; or an extra monitoring capability $P - N \cdot C$ may be counted into a monitoring capability corresponding to a span that includes a common search space set and/or a search space set scheduled based on a slot granularity in the slot 1, and therefore the monitoring capability corresponding to the span is $C + P - N \cdot C$, and the monitoring capability corresponding to another span in the slot 1 is still C.

For example, a monitoring capability corresponding to one span includes a maximum quantity of PDCCH monitoring times of the terminal side device in the span. Assuming that N=3, C=12, and a monitoring capability upper limit value corresponding to the slot 1 (namely, a maximum quantity of PDCCH monitoring times of the terminal side device in the slot 1) is 44, the extra monitoring capability is 44−12*3=8. If the extra monitoring capability is counted into the monitoring capability corresponding to the first span in the slot 1, the monitoring capability corresponding to the first span is 12+8=20, and both a monitoring capability corresponding to the second span and a monitoring capability corresponding to the third span are 12. For another example, a monitoring capability corresponding to one span includes a maximum value of a quantity of CCEs used by the terminal side device for channel estimation in the span. Assuming that N=3, C=15, and a monitoring capability upper limit value corresponding to the slot 1 (namely, a maximum value of a quantity of CCEs used by the terminal side device for channel estimation in the slot 1) is 56, the extra monitoring capability is 56-15*3=ii. If the extra monitoring capability is counted into the monitoring capability corresponding to the first span in the slot 1, the monitoring capability corresponding to the first span is 15+11=26, and both a monitoring capability corresponding to the second span and a monitoring capability corresponding to the third span are 15. When a monitoring capability corresponding to one span includes a maximum quantity of PDCCH monitoring times of the terminal side device in the span and a maximum value of a quantity of CCEs used by the terminal side device for channel estimation in the span, refer to the descriptions of the foregoing examples, and details are not described herein.

In yet another possible case, the monitoring capabilities defined in Table 3 (or Table 4) may be specific to a terminal side device that supports a particular service type (for example, supports a URLLC service) or supports a particular processing capability (for example, supports a mini-slot (mini slot)). For example, the monitoring capabilities defined in Table 3 are specific to a terminal side device that supports a URLLC service. The terminal side device reports supported (X, Y) to the network side device. It is assumed that the terminal side device reports (2, 2), and a monitoring capability C (herein, for example, C indicates a maximum value of a quantity of CCEs used by the terminal side device for channel estimation in one span) corresponding to (2, 2) is 16. Correspondingly, if the terminal side device determines, based on the configuration information sent by the network side device, that a span pattern in one slot is a span pattern corresponding to (2, 2); to be specific, the slot has 7 spans and a time domain length of each span is two symbols, the terminal side device may determine that a monitoring capability C corresponding to each span is 16, and a monitoring capability upper limit supported by the entire slot is 16*7=112 CCEs. For example, if a common search space set and/or a search space set scheduled based on a slot granularity exist/exists in a span (in other words, a service other than the URLLC service further exists in the span), the terminal side device may add a monitoring capability X' to a monitoring capability corresponding to the span; in other words, the monitoring capability corresponding to the span is C+X', and a monitoring capability corresponding to another span that includes no common search space set and/or search space set scheduled based on the slot granularity is C. X' is a predefined value, or a value semi-statically indicated by the network side device to the terminal side device by using higher layer signaling (for example, RRC signaling). For example, if X' is 12, a total monitoring capability upper limit of the slot is 7%6+12=124. It should be noted that, for implementation of a case in which C indicates a maximum quantity of PDCCH monitoring times of the terminal side device in one span, refer to the implementation of the case in which C indicates a maximum value of a quantity of CCEs used by the terminal side device for channel estimation in one span.

The solutions provided in the embodiments of this application are mainly described above from a perspective of interaction between the network side device and the terminal side device. It may be understood that, to implement the foregoing functions, the network side device or the terminal side device may include a corresponding hardware structure and/or a software module for implementing each function. A person skilled in the art should easily be aware that, in combination with units and algorithm steps of the examples described in the embodiments disclosed in this specification, the embodiments of this application may be implemented by using hardware or a combination of hardware and computer software. Whether a function is performed by using hardware or hardware driven by computer software depends on particular applications and design constraints of the technical solutions. A person skilled in the art may use different methods to implement the described functions for each particular application, but it should not be considered that the implementation goes beyond the scope of this application.

Figure 4:
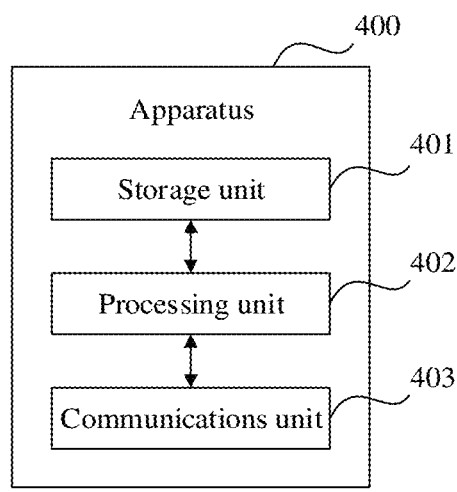
FIG. 4 is a possible example block diagram of an apparatus according to an embodiment of this application.

When an integrated unit is used, FIG. 4 is a possible example block diagram of an apparatus according to an embodiment of this application. The apparatus 400 may exist in a form of software. The apparatus 400 may include a processing unit 402 and a communications unit 403. The processing unit 402 is configured to control and manage an action of the apparatus 400. The communications unit 403 is configured to support the apparatus 400 in communicating with another network entity. Optionally, the communications unit 403 is also referred to as a transceiver unit, and may include a receiving unit and/or a sending unit, configured to respectively perform a receiving operation and a sending operation. The apparatus 400 may further include a storage unit 401, configured to store program code and/or data of the apparatus 400.

The processing unit 402 may be a processor or a controller, and may implement or execute various example logic blocks, modules, and circuits described with reference to the content disclosed in the embodiments of this application. The communications unit 403 may be a communications interface, a transceiver, a transceiver circuit, or the like. The communications interface is a general term. In specific implementation, the communications interface may include a plurality of interfaces. The storage unit 401 may be a memory.

The apparatus 400 may be the terminal side device in any one of the foregoing embodiments, or may be a chip disposed in the terminal side device. The processing unit 402 may support the apparatus 400 in performing the actions of the terminal side device in the foregoing method examples. Alternatively, the processing unit 402 mainly performs the terminal internal actions in the method examples, and the communications unit 403 may support communication between the apparatus 400 and a network side device. For example, the processing unit 402 is configured to perform steps 203 and 204 in FIG. 2. The communications unit 402 is configured to perform step 202 in FIG. 2.

Specifically, in an embodiment, the communications unit 403 is configured to receive configuration information sent by the network side device, where the configuration information is used to indicate a position for monitoring a downlink control channel; and the processing unit 402 is configured to determine, based on the configuration information, positions of a first time subunit and a second time subunit for monitoring the downlink control channel; and determine, based on a parameter corresponding to the first time subunit, a monitoring capability corresponding to the first time subunit, where the parameter corresponding to the first time subunit includes at least one of the following: a first time domain interval between a start position of the first time subunit and a start position of the second time subunit; a time domain length of the first time subunit; and a second time domain interval between the first time subunit and the second time subunit.

In a possible design, the second time subunit is located behind the first time subunit, or the second time subunit is located in front of the first time subunit.

In a possible design, the second time subunit is a non-empty time subunit that is located behind the first time subunit and closest to the first time subunit; or the second time subunit is a non-empty time subunit that is located in front of the first time subunit and closest to the first time subunit, where a search space set exists in the non-empty time subunit.

In a possible design, the processing unit 402 is specifically configured to obtain at least one monitoring parameter supported by the communications apparatus and a monitoring capability corresponding to the at least one monitoring parameter; determine a target monitoring parameter that matches the parameter corresponding to the first time subunit from the at least one monitoring parameter; and determine, based on a monitoring capability corresponding to the target monitoring parameter, the monitoring capability corresponding to the first time subunit.

In a possible design, each of the at least one monitoring parameter includes a minimum time domain interval between start positions of two adjacent time subunits located in a same time unit; and a minimum time domain interval, between start positions of two adjacent time subunits located in a same time unit, included in the target monitoring parameter is less than or equal to the first time domain interval.

In a possible design, each of the at least one monitoring parameter includes a minimum time domain interval between start positions of two adjacent time subunits located in a same time unit and a maximum time domain length of each time subunit in the time unit; and a minimum time domain interval, between start positions of two adjacent time subunits located in a same time unit, included in the target monitoring parameter is less than or equal to the first time domain interval, and a maximum time domain length, of each time subunit in the time unit, included in the target monitoring parameter is less than or equal to the time domain length of the first time subunit.

In a possible design, each of the at least one monitoring parameter includes a minimum time domain interval between start positions of two adjacent time subunits located in a same time unit and a maximum time domain length of each time subunit in the time unit; and a minimum time domain interval, between two adjacent time subunits in a same time unit, obtained based on the target monitoring parameter is less than or equal to the second time interval.

In a possible design, each of the at least one monitoring parameter includes a minimum time domain interval between start positions of two adjacent time subunits located in a same time unit; and an absolute value of a difference between a minimum time domain interval included in the target monitoring parameter and the first time domain interval is less than or equal to an absolute value of a difference between a minimum time domain interval included in a monitoring parameter other than the target monitoring parameter in the at least one monitoring parameter and the first time domain interval.

In a possible design, the processing unit 402 is specifically configured to: if the target monitoring parameter corresponds to a plurality of monitoring capabilities, determine that a minimum monitoring capability in the plurality of monitoring capabilities is the monitoring capability corresponding to the first time subunit.

In a possible design, the processing unit 402 is specifically configured to: if the target monitoring parameter corresponds to a plurality of monitoring capabilities, when the first time subunit meets a first condition, determine that a maximum monitoring capability in the plurality of monitoring capabilities is the monitoring capability corresponding to the first time subunit, where the first condition includes: a common search space set and/or a search space set scheduled based on a time unit granularity exist/exists in the first time subunit; and/or the first time domain interval is greater than a first threshold.

In a possible design, the communications unit 403 is further configured to receive indication information sent by the network side device, where the indication information is used to indicate a monitoring capability corresponding to the second time subunit; and the processing unit 402 is further configured to obtain, based on the indication information, the monitoring capability corresponding to the second time subunit.

In a possible design, the monitoring capability corresponding to the second time subunit is one of at least one monitoring capability supported by the communications apparatus.

In a possible design, the processing unit 402 is further configured to determine a monitoring capability corresponding to another time subunit in a first time unit in which the first time subunit is located; determine a minimum monitoring capability based on the monitoring capability corresponding to the first time subunit and the monitoring capability corresponding to the another time subunit in the first time unit; and monitor the downlink control channel at least in each time subunit in the first time unit based on the minimum monitoring capability.

It should be noted that, in the embodiments of this application, division into the units is an example and is merely logical function division, and may be other division in actual implementation. Functional modules in the embodiments of this application may be integrated into one processing module, or each of the modules may exist alone physically, or two or more modules are integrated into one module. The integrated module may be implemented in a form of hardware, or may be implemented in a form of a software functional module.

When the integrated module is implemented in the form of a software functional module and sold or used as an independent product, the integrated module may be stored in a computer-readable storage medium. Based on such an understanding, the technical solutions in the embodiments of this application essentially, or the part contributing to the prior art, or all or some of the technical solutions may be implemented in the form of a software product. The computer software product is stored in a storage medium and includes several instructions for instructing a computer device (which may be a personal computer, a server, a network side device, or the like) or a processor to perform all or some of the steps of the method described in the embodiments of this application. The storage medium may be various media that can store program code, such as a memory.

Figure 5:
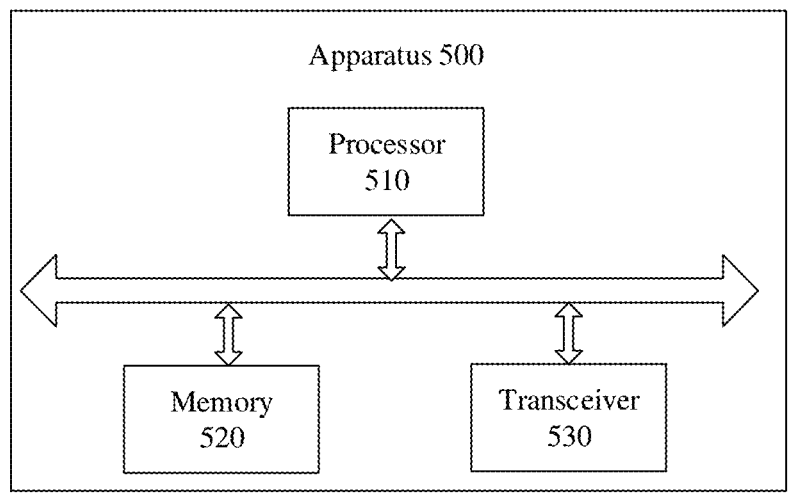
FIG. 5 is a schematic structural diagram of an apparatus according to an embodiment of this application.

FIG. 5 is a schematic structural diagram of an apparatus. The apparatus 500 includes a processor 510, a memory 520, and a transceiver 530. In an example, the apparatus 500 may implement the functions of the apparatus 400 illustrated in FIG. 4. Specifically, the function of the communications unit 403 illustrated in FIG. 4 may be implemented by the transceiver, the function of the processing unit 402 may be implemented by the processor, and the function of the storage unit 401 may be implemented by the memory. In another example, the apparatus 500 may be the terminal side device in the foregoing method embodiment, and the apparatus 500 may be configured to implement the method, corresponding to the terminal side device, described in the foregoing method embodiment. For details, refer to the descriptions in the foregoing method embodiment.

Figure 6:
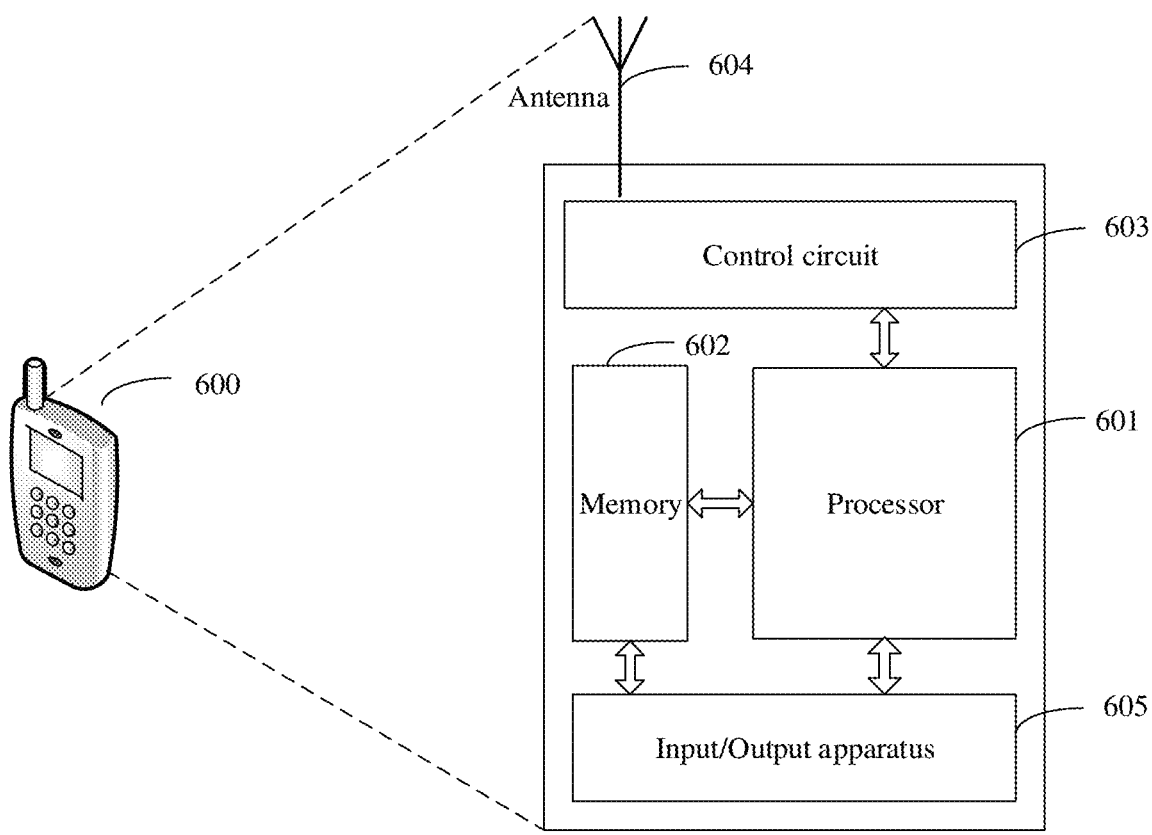
FIG. 6 is a schematic structural diagram of a terminal device according to an embodiment of this application.

FIG. 6 is a schematic structural diagram of a terminal side device 600 according to an embodiment of this application. For ease of description, FIG. 6 shows only main components of the terminal side device. As shown in FIG. 6, the terminal side device 600 includes a processor 601, a memory 602, a control circuit 603, an antenna 604, and an input/output apparatus 605. The terminal side device 600 may be applied to the system architecture shown in FIG. 1a, and performs the functions of the terminal side device in the foregoing method embodiments.

The processor 601 is mainly configured to process a communication protocol and communication data, control the entire terminal side device, execute a software program, and process data of the software program. For example, the processor 601 is configured to control the terminal side device to perform the actions described in the foregoing method embodiments. The memory 602 is mainly configured to store the software program and the data. The control circuit 603 is mainly configured to perform conversion between a baseband signal and a radio frequency signal, and process the radio frequency signal. The control circuit 603, together with the antenna 604, may also be referred to as a transceiver, mainly configured to send/receive a radio frequency signal in a form of an electromagnetic wave. The input/output apparatus 605, such as a touchscreen, a display screen, or a keyboard, is mainly configured to receive data entered by a user and output data to the user.

After the terminal side device is powered on, the processor 601 may read the software program in the memory 602, explain and execute an instruction of the software program, and process the data of the software program. When data needs to be sent in a wireless manner, the processor 601 performs baseband processing on the to-be-sent data, and then outputs a baseband signal to a radio frequency circuit. The radio frequency circuit performs radio frequency processing on the baseband signal, and then sends a radio frequency signal in the form of an electromagnetic wave through antenna 604. When data is sent to the terminal side device, the radio frequency circuit receives a radio frequency signal through the antenna, converts the radio frequency signal into a baseband signal, and outputs the baseband signal to the processor 601, and the processor 601 converts the baseband signal into data and processes the data.

A person skilled in the art may understand that for ease of description, FIG. 6 shows only one memory 602 and only one processor 601. Actually, the terminal side device may have a plurality of processors 601 and a plurality of memories 602. The memory 602 may also be referred to as a storage medium, a storage device, or the like. This is not limited in this embodiment of this application.

In an optional implementation, the processor 601 may include a baseband processor and a central processing unit. The baseband processor is mainly configured to process the communication protocol and the communication data. The central processing unit is mainly configured to control the entire terminal side device, execute the software program, and process the data of the software program. The processor 601 in FIG. 6 integrates functions of the baseband processor and the central processing unit. A person skilled in the art may understand that the baseband processor and the central processing unit may alternatively be processors independent of each other, and are interconnected by using a technology such as a bus. A person skilled in the art may understand that, the terminal side device may include a plurality of baseband processors to adapt to different network standards, the terminal side device may include a plurality of central processing units to enhance a processing capability of the terminal side device, and components of the terminal side device may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor 601, or may be stored in the memory 602 in a form of a software program. The processor 601 executes the software program to implement a baseband processing function.

The terminal side device 600 shown in FIG. 6 can implement processes related to the terminal side device in the method embodiment illustrated in FIG. 2. Operations and/or functions of the modules in the terminal side device 600 are respectively used to implement the corresponding procedures in the foregoing method embodiment. For details, refer to the descriptions in the foregoing method embodiment. To avoid repetition, detailed descriptions are appropriately omitted herein.

In an implementation process, the steps in the method provided in the embodiments may be implemented by using a hardware integrated logical circuit in the processor or instructions in a form of software. The steps of the method disclosed with reference to the embodiments of this application may be directly performed by a hardware processor, or may be performed by using a combination of hardware in the processor and a software module.

It should be noted that, the processor in the embodiments of this application may be an integrated circuit chip, and has a signal processing capability. In an implementation process, the steps in the foregoing method embodiment may be implemented by using a hardware integrated logical circuit in the processor or instructions in a form of software. The processor may be a general-purpose central processing unit (CPU), a general-purpose processor, digital signal processing (DSP), an application-specific integrated circuit (ASIC), a field programmable gate array (FPGA) or another programmable logic device, a transistor logic device, a hardware component, or any combination thereof. Alternatively, the processor may be a combination implementing a computing function, for example, a combination including one or more microprocessors, or a combination of a DSP and a microprocessor. The general-purpose processor may be a microprocessor, or the processor may be any conventional processor or the like.

It may be understood that, the memory or the storage unit in the embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, RAMs in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that, the memory of the system and method described in this specification is intended to include but not being limited to these memories and any memory of another proper type.

All or some of the foregoing embodiments may be implemented by using software, hardware, firmware, or any combination thereof. When software is used to implement the embodiments, all or some of the embodiments may be implemented in a form of a computer program product. The computer program product includes one or more computer programs or instructions. When the computer program or instruction is loaded and executed on a computer, all or some of the procedures or functions in the embodiments of this application are performed. The computer may be a general-purpose computer, a dedicated computer, a computer network, or other programmable apparatuses. The computer program or instruction may be stored in a computer-readable storage medium, or may be transmitted by using the computer-readable storage medium. The computer-readable storage medium may be any usable medium accessible to a computer, or a data storage device, such as a server, into which one or more usable media are integrated. The usable medium may be a magnetic medium, for example, a floppy disk, a hard disk, or a magnetic tape, or may be an optical medium, for example, a DVD, or may be a semiconductor medium, for example, a solid-state drive (SSD).

The various illustrative logical units and circuits described in the embodiments of this application may implement or operate the described functions by using a general-purpose processor, a digital signal processor, an application-specific integrated circuit (ASIC), a field programmable gate array (FPGA) or another programmable logic apparatus, a discrete gate or transistor logic, a discrete hardware component, or a design of any combination thereof. The general-purse processor may be a microprocessor. Optionally, the general-purpose processor may be any conventional processor, controller, microcontroller, or state machine. The processor may alternatively be implemented by a combination of computing apparatuses, such as a digital signal processor and a microprocessor, a plurality of microprocessors, one or more microprocessors with one digital signal processor core, or any other similar configuration.

The steps of the method or algorithm described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium in any other form in the art. For example, the storage medium may be connected to a processor, so that the processor may read information from the storage medium and write information to the storage medium. Optionally, the storage medium may be integrated into a processor. The processor and the storage medium may be disposed in an ASIC, and the ASIC may be disposed in a terminal side device. Optionally, the processor and the storage medium may be disposed in different components of the terminal side device.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although the embodiments of this application are described with reference to specific features, it is clear that various modifications and combinations may be made to the embodiments of this application without departing from the spirit and scope of the embodiments of this application. Correspondingly, the specification and accompanying drawings are merely example descriptions of the embodiments of this application that are defined by the appended claims, and are considered as any or all of modifications, variations, combinations, or equivalents that cover the scope of the embodiments of this application.

What is claimed is:

1. A communication method, wherein the method comprises:
   receiving, by a terminal side device, configuration information sent by a network side device, wherein the configuration information indicates a position in a time domain or a frequency domain for monitoring a downlink control channel;
   determining, by the terminal side device based on the configuration information, positions of a first time subunit and a second time subunit, in a first time unit, for monitoring the downlink control channel;
   obtaining, by the terminal side device, a mapping relationship between at least one monitoring parameter and at least one monitoring capability parameter;
   determining, by the terminal side device from the at least one monitoring parameter, a target monitoring parameter that matches a first monitoring parameter corresponding to the first time subunit;
   determining, by the terminal side device based on a monitoring capability parameter corresponding to the target monitoring parameter, a monitoring capability parameter corresponding to the first time subunit, the monitoring capability parameter corresponding to the first time subunit indicating capability of the terminal side device to monitor downlink control channels in the first time subunit, wherein the first monitoring parameter corresponding to the first time subunit comprises a first time domain interval between a start position of the first time subunit and a start position of the second time subunit, and the first monitoring parameter corresponding to the first time subunit is associated with the monitoring capability parameter corresponding to the first time subunit in the mapping relationship between at least one monitoring parameter and at least one monitoring capability parameter; and
   monitoring, by the terminal side device, the downlink control channel in the first time subunit according to the monitoring capability parameter corresponding to the first time subunit.

2. The method according to claim 1, wherein
the second time subunit is located after the first time subunit in the time domain, or the second time subunit is located before the first time subunit in the time domain.

3. The method according to claim 1, wherein
the second time subunit is a non-empty time subunit that is located after the first time subunit in the time domain and closest to the first time subunit in the first time unit; or
the second time subunit is a non-empty time subunit that is located before the first time subunit in the time domain and closest to the first time subunit in the first time unit, and
wherein a search space set exists in the non-empty time subunit.

4. The method according to claim 1, wherein
each of the at least one monitoring parameter comprises a minimum time domain interval between start positions of two adjacent time subunits located in a same time unit; and
the minimum time domain interval comprised in the target monitoring parameter is less than or equal to the first time domain interval.

5. The method according to claim 1, wherein
each of the at least one monitoring parameter comprises a minimum time domain interval between start positions of two adjacent time subunits located in a same time unit and a maximum time domain length of each time subunit in the same time unit; and
a minimum time domain interval comprised in the target monitoring parameter is less than or equal to the first time domain interval, and a maximum time domain length comprised in the target monitoring parameter is less than or equal to a time domain length of the first time subunit.

6. The method according to claim 1, wherein
each of the at least one monitoring parameter comprises a minimum time domain interval between start positions of two adjacent time subunits located in a same time unit and a maximum time domain length of each time subunit in the same time unit; and
a minimum time domain interval, between two adjacent time subunits in a same time unit, obtained based on the target monitoring parameter is less than or equal to a second time interval between the first time subunit and the second time subunit.

7. The method according to claim 1, wherein
each of the at least one monitoring parameter comprises a minimum time domain interval between start positions of two adjacent time subunits located in a same time unit; and
an absolute value of a difference between a minimum time domain interval comprised in the target monitoring parameter and the first time domain interval is less than or equal to an absolute value of a difference between a minimum time domain interval comprised in a monitoring parameter other than the target monitoring parameter in the at least one monitoring parameter and the first time domain interval.

8. The method according to claim 1, wherein determining, by the terminal side device based on the monitoring capability parameter corresponding to the target monitoring parameter, the monitoring capability parameter corresponding to the first time subunit comprises:

when the target monitoring parameter corresponds to a plurality of monitoring capability parameters, determining, by the terminal side device, that a minimum monitoring capability in the plurality of monitoring capability parameters is the monitoring capability parameter corresponding to the first time subunit.

9. The method according to claim 1, wherein determining, by the terminal side device based on the monitoring capability parameter corresponding to the target monitoring parameter, the monitoring capability parameter corresponding to the first time subunit comprises:

when the target monitoring parameter corresponds to a plurality of monitoring capability parameters, and when the first time subunit meets a first condition, determining, by the terminal side device, that a maximum monitoring capability parameter in the plurality of monitoring capability parameters is the monitoring capability parameter corresponding to the first time subunit, wherein the first condition comprises: a common search space set or a search space set scheduled based on a time unit granularity exists in the first time subunit; or the first time domain interval is greater than a first threshold.

10. A communications apparatus, wherein the apparatus comprises a processor and a non-transitory memory storing instructions, wherein the instructions are executable by the processor to cause the apparatus to perform operations of:

receiving configuration information sent by a network side device, wherein the configuration information indicates a position in a time domain or a frequency domain for monitoring a downlink control channel; and determining, based on the configuration information, positions of a first time subunit and a second time subunit, in a first time unit, for monitoring the downlink control channel;

obtaining a mapping relationship between at least one monitoring parameter and at least one monitoring capability parameter;

determining, from the at least one monitoring parameter, a target monitoring parameter that matches a first monitoring parameter corresponding to the first time subunit;

determining, based on a monitoring capability parameter corresponding to the target monitoring parameter, a monitoring capability parameter corresponding to the first time subunit, the monitoring capability parameter corresponding to the first time subunit indicating capability of the apparatus to monitor downlink control channels in the first time subunit, wherein the first monitoring parameter corresponding to the first time subunit comprises a first time domain interval between a start position of the first time subunit and a start position of the second time subunit, and the first monitoring parameter corresponding to the first time subunit is associated with the monitoring capability parameter corresponding to the first time subunit in the mapping relationship between at least one monitoring parameter and at least one monitoring capability parameter; and monitoring the downlink control channel in the first time subunit according to the monitoring capability parameter corresponding to the first time subunit.

11. The apparatus according to claim 10, wherein the second time subunit is located after the first time subunit in the time domain, or the second time subunit is located before the first time subunit in the time domain.

12. The apparatus according to claim 10, wherein the second time subunit is a non-empty time subunit that is located after the first time subunit in the time domain and closest to the first time subunit in the first time unit; or the second time subunit is a non-empty time subunit that is located before the first time subunit in the time domain and closest to the first time subunit in the first time unit, and wherein a search space set exists in the non-empty time subunit.

13. The apparatus according to claim 10, wherein each of the at least one monitoring parameter comprises a minimum time domain interval between start positions of two adjacent time subunits located in a same time unit; and a minimum time domain interval comprised in the target monitoring parameter is less than or equal to the first time domain interval.

14. The apparatus according to claim 10, wherein each of the at least one monitoring parameter comprises a minimum time domain interval between start positions of two adjacent time subunits located in a same time unit and a maximum time domain length of each time subunit in the same time unit; and a minimum time domain interval comprised in the target monitoring parameter is less than or equal to the first time domain interval, and a maximum time domain length comprised in the target monitoring parameter is less than or equal to a time domain length of the first time subunit.

15. The apparatus according to claim 10, wherein each of the at least one monitoring parameter comprises a minimum time domain interval between start positions of two adjacent time subunits located in a same time unit and a maximum time domain length of each time subunit in the same time unit; and a minimum time domain interval obtained based on the target monitoring parameter is less than or equal to a second time interval between the first time subunit and the second time subunit.

16. The apparatus according to claim 10, wherein each of the at least one monitoring parameter comprises a minimum time domain interval between start positions of two adjacent time subunits located in a same time unit; and an absolute value of a difference between the minimum time domain interval comprised in the target monitoring parameter and the first time domain interval is less than or equal to an absolute value of a difference between a minimum time domain interval comprised in a monitoring parameter other than the target monitoring parameter in the at least one monitoring parameter and the first time domain interval.

17. The apparatus according to claim 10, wherein the operations further comprise:
when the target monitoring parameter corresponds to a plurality of monitoring capability parameters, determining that a minimum monitoring capability parameter in the plurality of monitoring capability parameters is the monitoring capability parameter corresponding to the first time subunit.

18. The apparatus according to claim 10, wherein the operations further comprise:
when the target monitoring parameter corresponds to a plurality of monitoring capability parameters, and when the first time subunit meets a first condition, determining that a maximum monitoring capability parameter in the plurality of monitoring capability parameters is the monitoring capability parameter corresponding to the first time subunit, wherein
the first condition comprises: a common search space set or a search space set scheduled based on a time unit granularity exists in the first time subunit; or the first time domain interval is greater than a first threshold.

* * * * *